(12) United States Patent
Tsai et al.

(10) Patent No.: US 8,385,006 B2
(45) Date of Patent: Feb. 26, 2013

(54) PHOTOGRAPHING OPTICAL LENS ASSEMBLY

(75) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 78 days.

(21) Appl. No.: 13/196,687

(22) Filed: Aug. 2, 2011

(65) Prior Publication Data
US 2012/0243108 A1    Sep. 27, 2012

(30) Foreign Application Priority Data
Mar. 25, 2011  (TW) .................................. 100110435

(51) Int. Cl.
*G02B 3/02*  (2006.01)
*G02B 13/18*  (2006.01)

(52) U.S. Cl. ........................ 359/713; 359/708
(58) Field of Classification Search .................. 359/642, 359/708, 713
See application file for complete search history.

(56) References Cited

U.S. PATENT DOCUMENTS

| | | | | |
|---|---|---|---|---|
| 4,768,868 A | * | 9/1988 | Wakamiya et al. | 359/754 |
| 5,212,597 A | * | 5/1993 | Yamada | 359/649 |
| 6,396,641 B2 | * | 5/2002 | Hirata et al. | 359/649 |
| 7,365,920 B2 | | 4/2008 | Noda | |
| 2012/0188654 A1 | * | 7/2012 | Huang | 359/713 |

* cited by examiner

*Primary Examiner* — James Greece
(74) *Attorney, Agent, or Firm* — Morris Manning & Martin LLP; Tim Tingkang Xia, Esq.

(57) ABSTRACT

An photographing optical lens assembly includes, in order from an object side to an image side, a first lens element with positive refractive power having a convex object-side surface, a second lens element, a third lens element, a fourth lens element having at least one aspheric surface, a fifth lens element having a convex object-side surface and a concave image-side surface with at least one surface being aspheric and at least one inflection point being formed, and a sixth lens element having a concave image-side surface with at least one surface being aspheric. By adjusting the curvature radii of the fifth lens element, the photographing optical lens assembly can stay compact and correct the aberration while obtaining superior imaging quality.

22 Claims, 18 Drawing Sheets

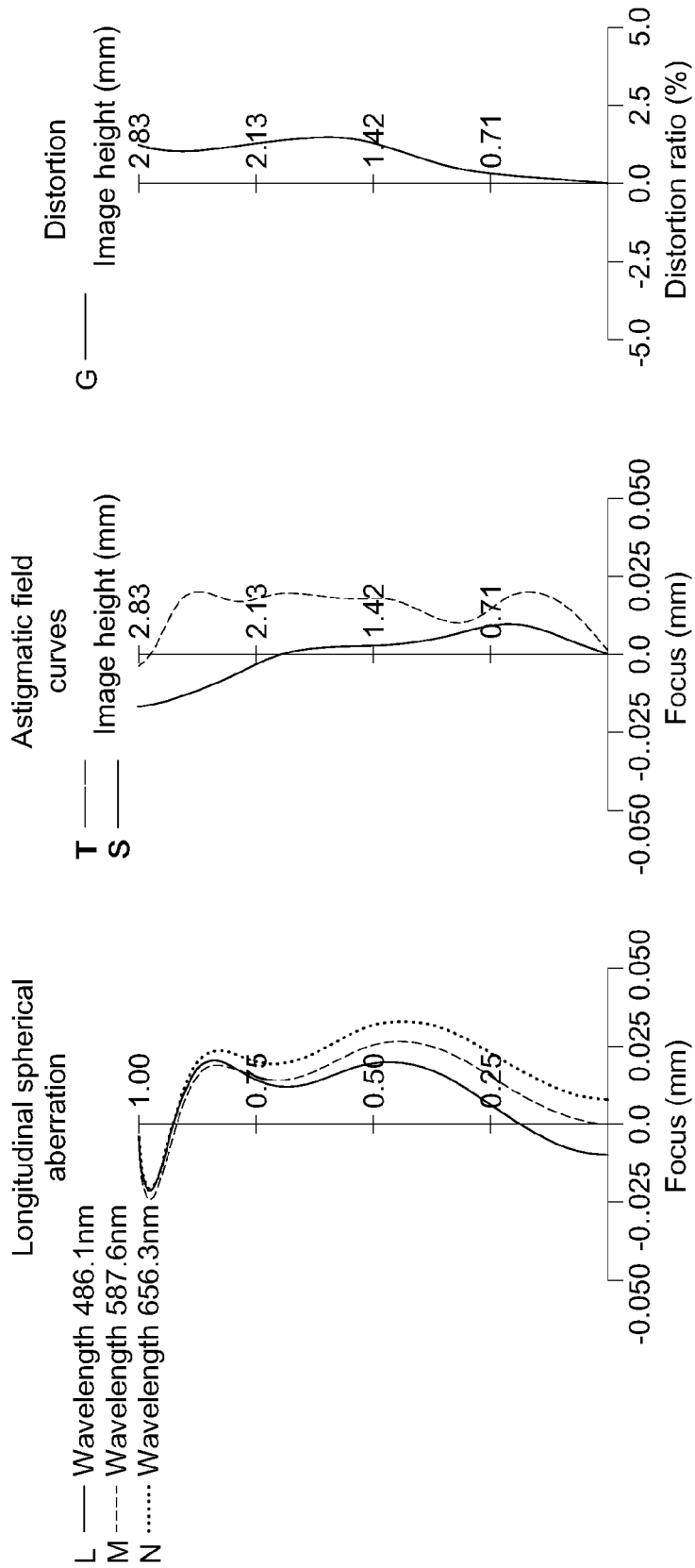

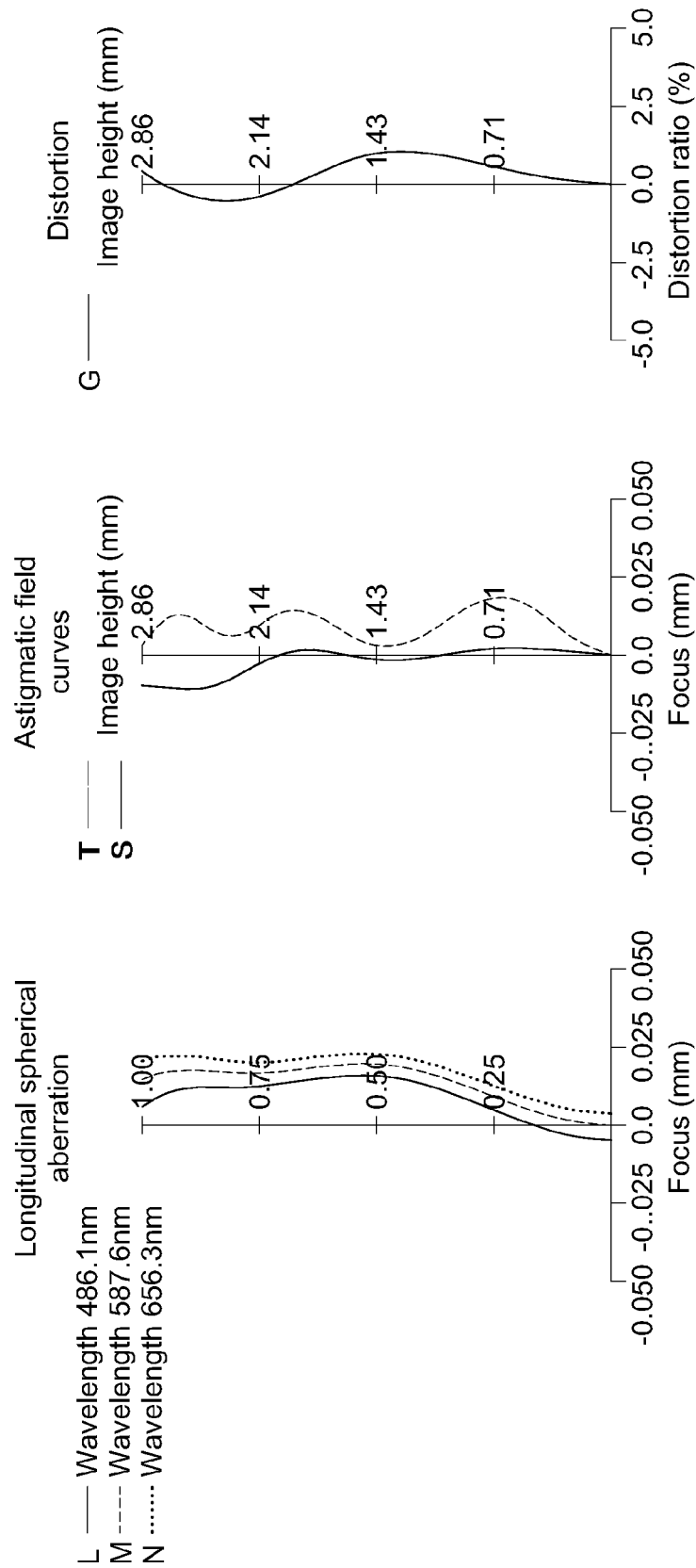

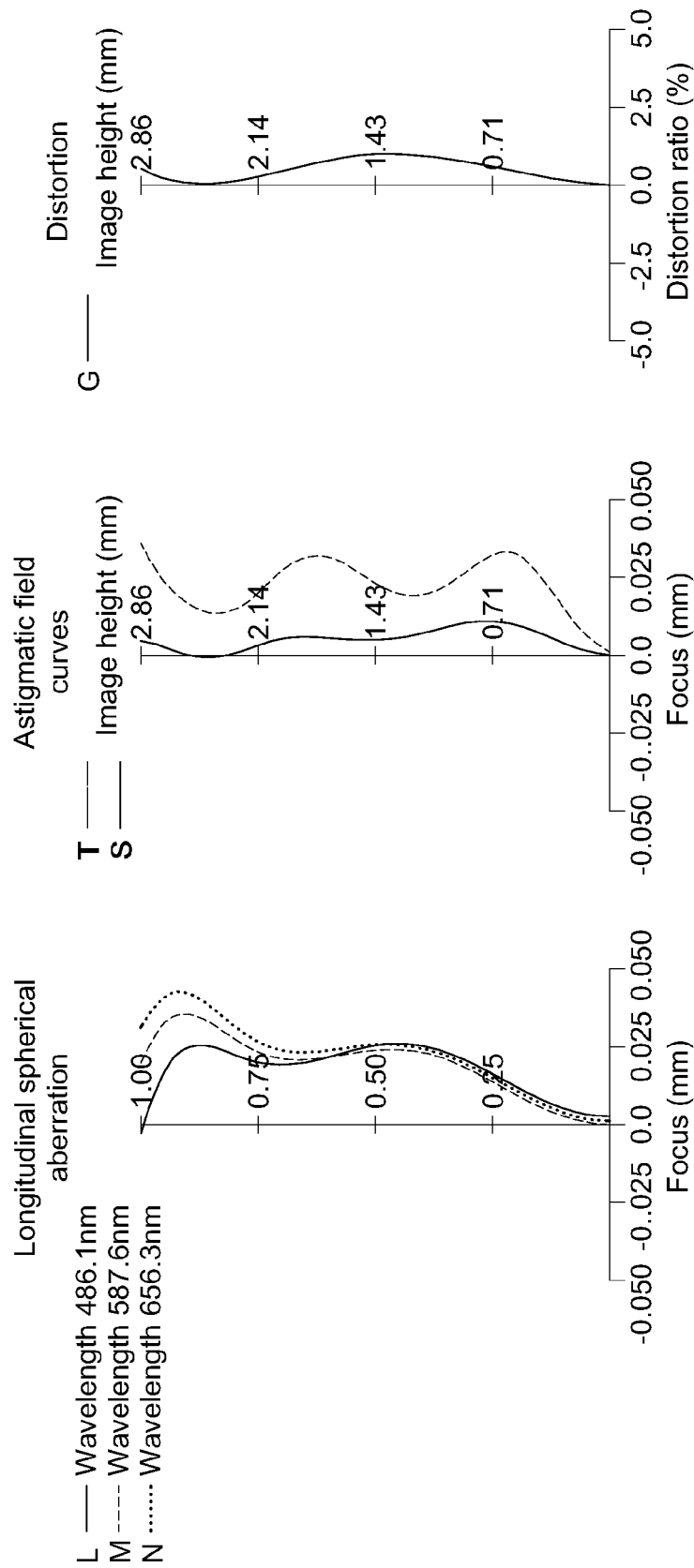

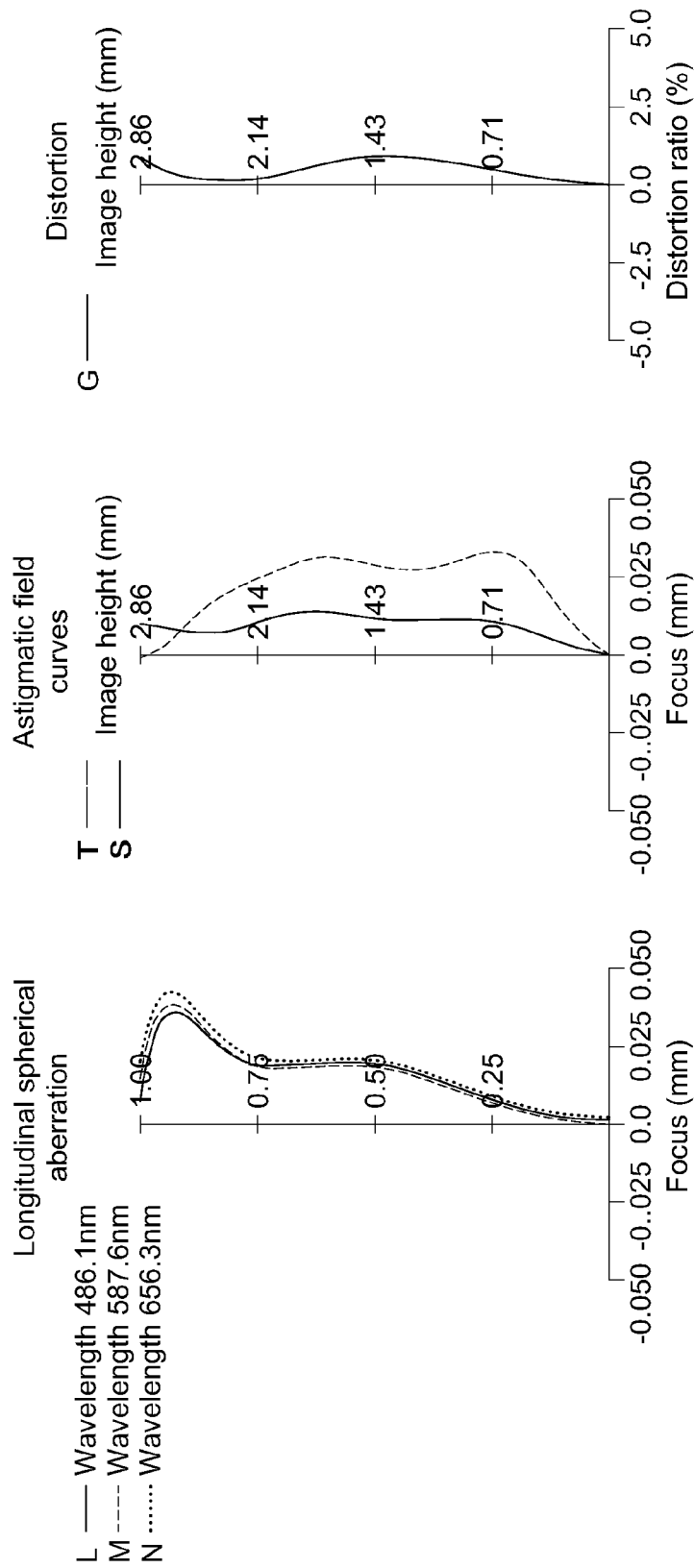

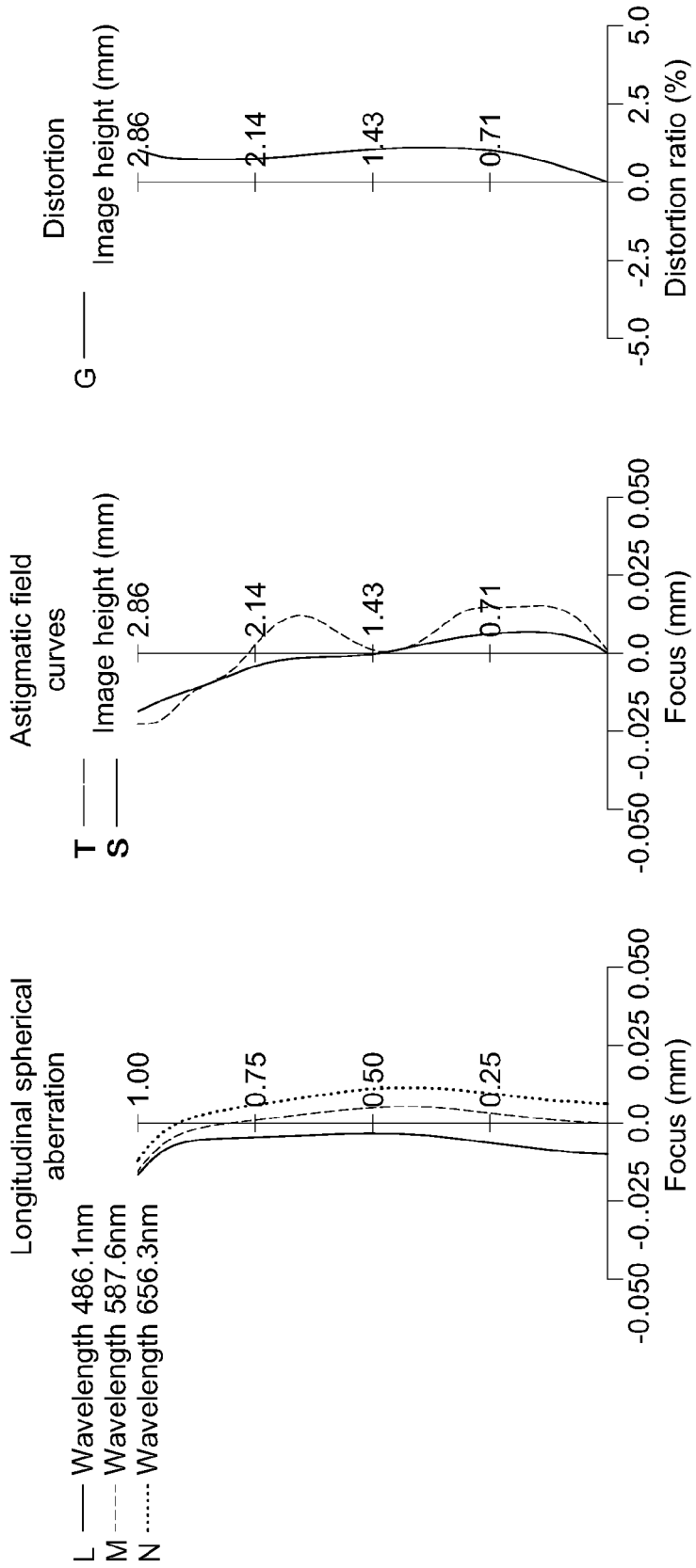

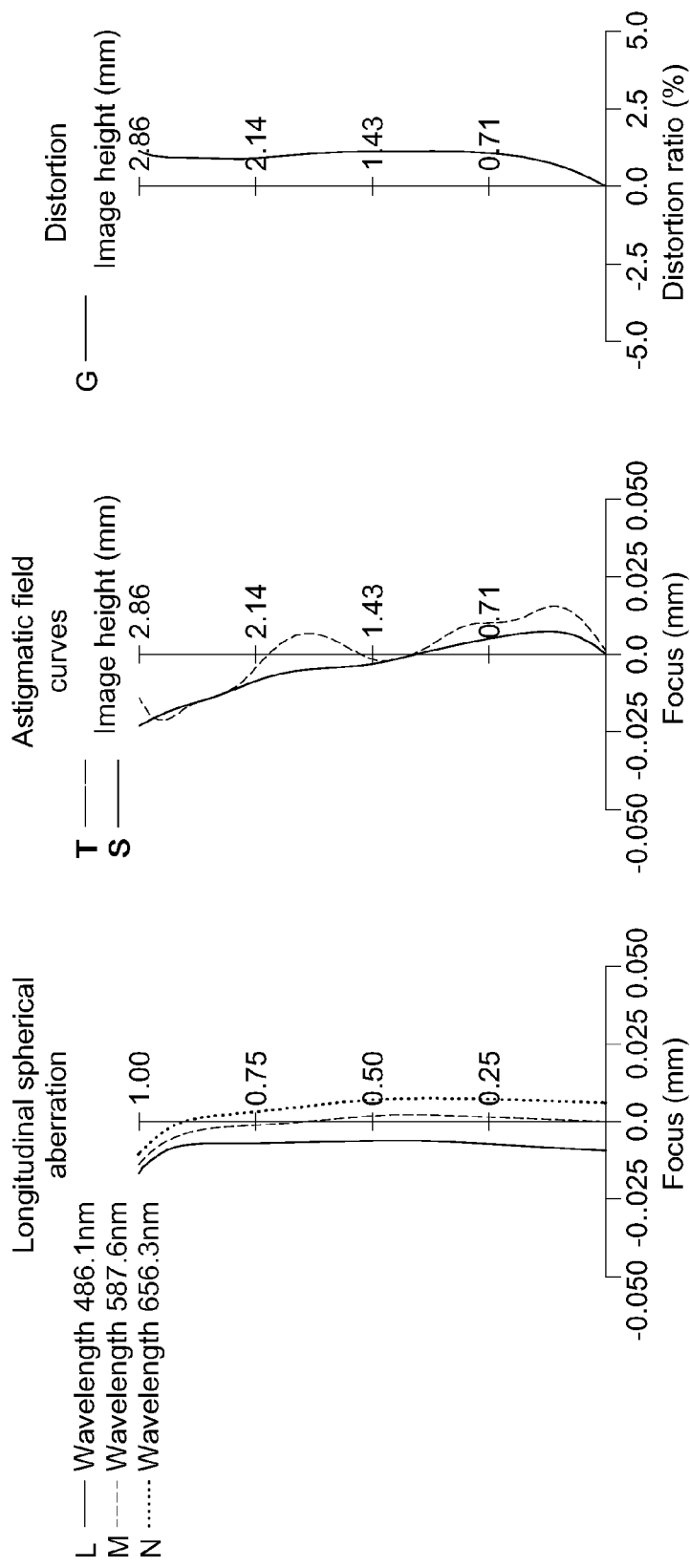

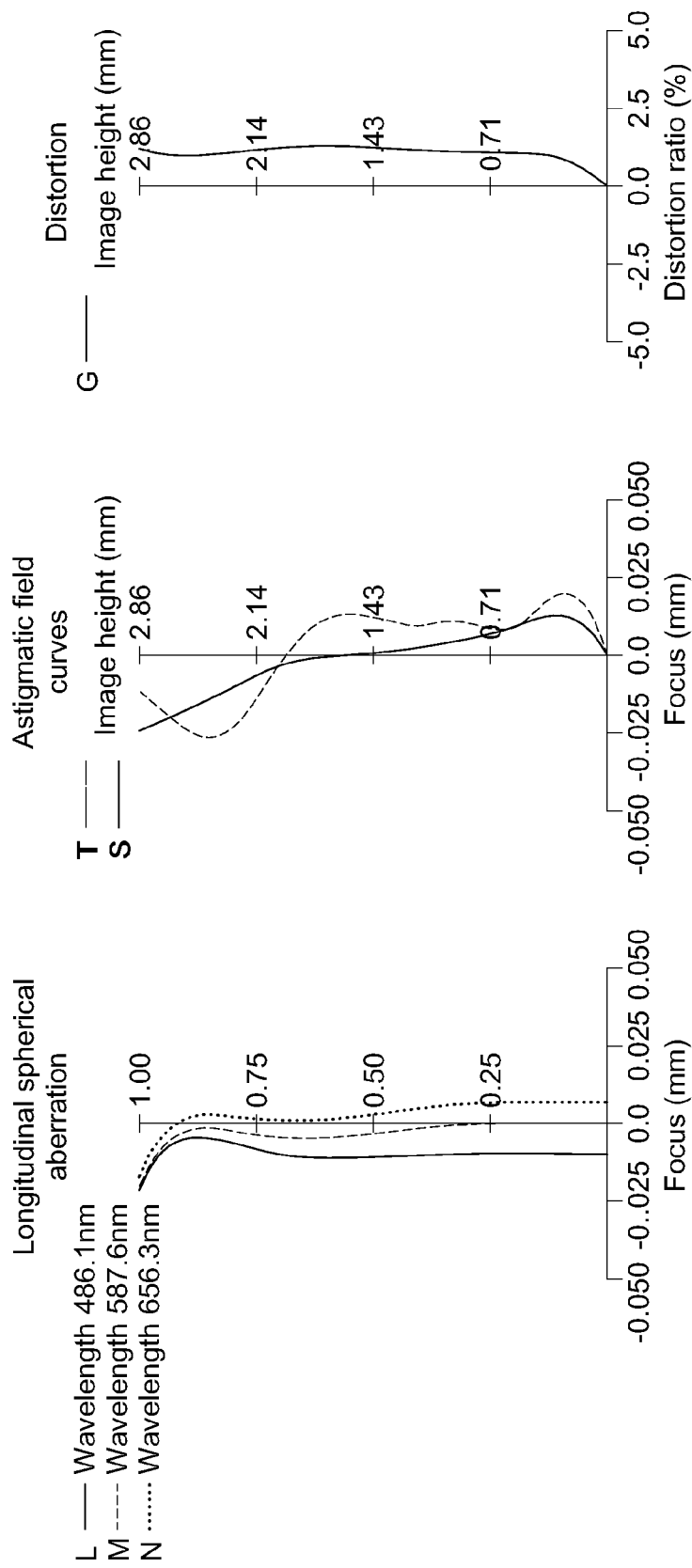

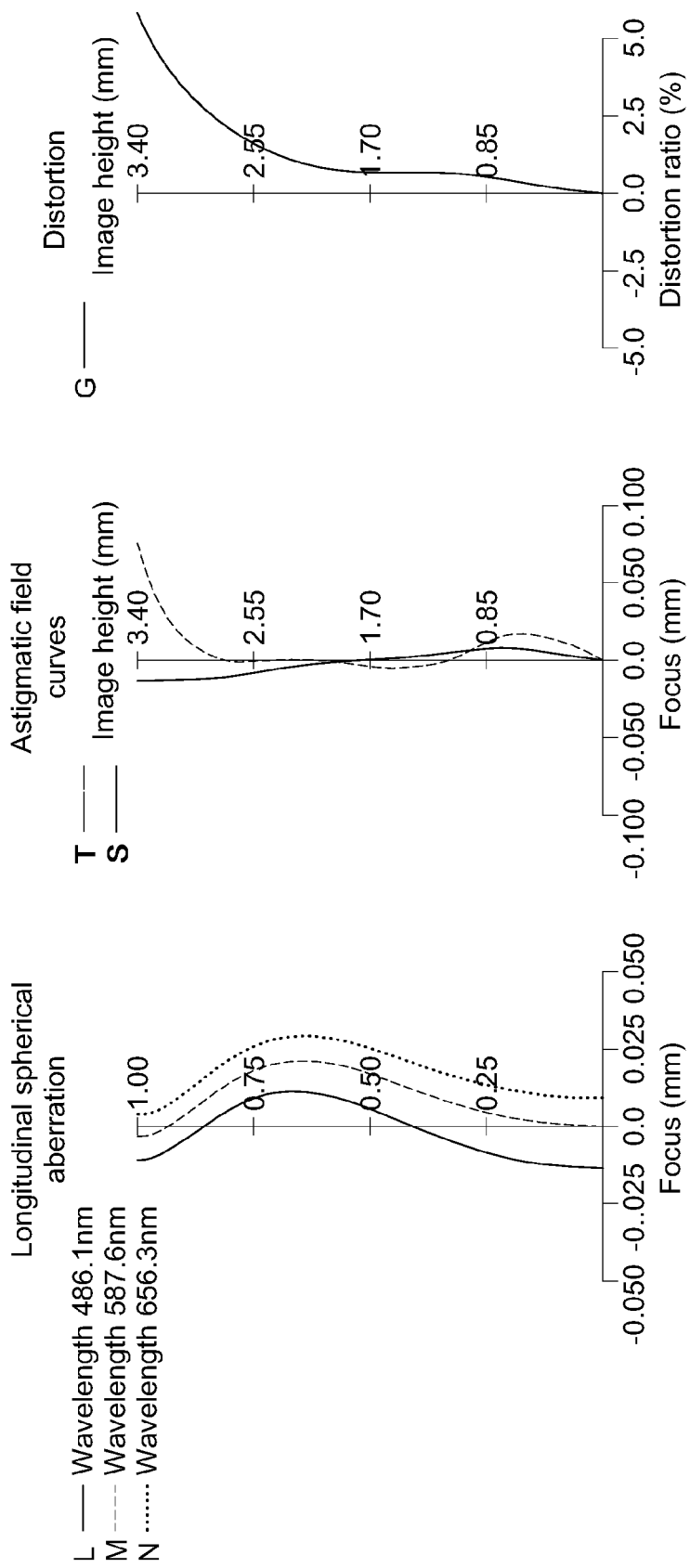

PHOTOGRAPHING OPTICAL LENS ASSEMBLY

CROSS-REFERENCE TO RELATED APPLICATIONS

This non-provisional application claims priority under 35 U.S.C. §119(a) on Patent Application No(s). 100110435 filed in Taiwan, R.O.C. on Mar. 25, 2011, the entire contents of which are hereby incorporated by reference.

BACKGROUND

1. Technical Field

The present disclosure relates to an optical lens assembly, and more particularly to a compact optical lens assembly.

2. Related Art

In recent years, with the prosperity of photographing optical lens assemblies, the demand for compact photographing cameras increases exponentially. The photo-sensing device, e.g. a sensor, of an ordinary photographing camera is commonly selected from a charge coupled device (CCD) and a complementary metal-oxide semiconductor (CMOS) device. In addition, as the advanced semiconductor manufacturing technology enables the miniaturization of pixel size of sensors, the resolution of a compact optical lens assembly is gradually increased, so that there is an increasing demand for a compact optical lens assembly capable of generating better quality image.

A conventional compact photographing lens used in a mobile electronic device usually consists of four lens elements, which is disclosed in U.S. Pat. No. 7,365,920. However, with the growing popularity of high technology mobile devices including Smart Phone, and PDA (Personal Digital Assistant), the demand for the compact photographing lens with better resolution and image quality increases exponentially. The conventional four lens assembly does not fulfill the specification of the high-level photographing lens assembly. With the electronic devices heading towards the direction of high functionality while being as small and light as possible, the inventors recognize that an optical imaging system capable of improving the image quality of mobile electronic devices as well as miniaturizing the overall size of the camera lens equipped therewith is urgently needed.

SUMMARY

According to an embodiment, a photographing optical lens assembly comprises, in order from an object side to an image side: a first lens element with positive refractive power having a convex object-side surface, a second lens element, a third lens element, a fourth lens element with at least one aspheric surface, a fifth lens element with at least one inflection point having a convex object-side surface and a concave image-side surface and a sixth lens element having an object side surface and a concave object-side surface. At least one of the object-side surface and the image-side surface of the fifth lens element is aspheric; at least one of the concave image-side surface and the object-side surface of the sixth lens element is aspheric.

The photographing optical lens assembly satisfies the following condition:

$-0.3 < (R_9 - R_{10})/(R_9 + R_{10}) < 0.6$     (Condition 1):

Wherein $R_9$ is the curvature radius of the object-side surface of the fifth lens element; $R_{10}$ is the curvature radius of the image-side surface of the fifth lens element.

According to another embodiment, a photographing optical lens assembly comprises, in order from an object side to an image side: a first lens element with positive refractive power having a convex object-side surface; a second lens element; a third lens element; a fourth lens element having a concave object-side surface and a convex image-side surface, a fifth lens element having a convex object-side surface and a concave image-side surface and a sixth lens element having a convex object-side surface and a concave image-side surface. At least one of the object-side surface and the image-side surface of the fourth lens element is aspheric; at least one of the object-side surface and the image-side surface of the fifth lens element is aspheric; at least one of the object-side surface and the image-side surface of the sixth lens element is aspheric. The fifth lens element and the sixth lens element are made of plastic.

BRIEF DESCRIPTION OF THE DRAWINGS

The present disclosure will become more fully understood from the following detailed description when taken in connection with the accompanying drawings, which show, for purpose of illustrations only, and thus do not limit other possible embodiments derived from the spirit of the present disclosure, and wherein:

FIG. 1B is a schematic view of longitudinal spherical aberration curves when the lights having wavelengths of 486.1 nm, 587.6 nm, and 656.3 nm are respectively projected in the photographing optical lens assembly in FIG. 1A;

FIG. 1C is a schematic view of astigmatic field curves when the light having the wavelength of 587.6 nm is projected in the photographing optical lens assembly in FIG. 1A;

FIG. 1D is a schematic view of a distortion curve when the light having the wavelength of 587.6 nm is projected in the photographing optical lens assembly in FIG. 1A;

FIG. 3B is a schematic view of longitudinal spherical aberration curves when the lights having wavelengths of 486.1 nm, 587.6 nm, and 656.3 nm are respectively projected in the photographing optical lens assembly in FIG. 3A;

FIG. 3C is a schematic view of astigmatic field curves when the light having the wavelength of 587.6 nm is projected in the photographing optical lens assembly in FIG. 3A;

FIG. 3D is a schematic view of a distortion curve when the light having the wavelength of 587.6 nm is projected in the photographing optical lens assembly in FIG. 3A;

FIG. 4B is a schematic view of longitudinal spherical aberration curves when the lights having wavelengths of 486.1 nm, 587.6 nm, and 656.3 nm are respectively projected in the photographing optical lens assembly in FIG. 4A;

FIG. 4C is a schematic view of astigmatic field curves when the light having the wavelength of 587.6 nm is projected in the photographing optical lens assembly in FIG. 4A;

FIG. 4D is a schematic view of a distortion curve when the light having the wavelength of 587.6 nm is projected in the photographing optical lens assembly in FIG. 4A;

FIG. 5B is a schematic view of longitudinal spherical aberration curves when the lights having wavelengths of 486.1 nm, 587.6 nm, and 656.3 nm are respectively projected in the photographing optical lens assembly in FIG. 5A;

FIG. 5C is a schematic view of astigmatic field curves when the light having the wavelength of 587.6 nm is projected in the photographing optical lens assembly in FIG. 5A;

FIG. 5D is a schematic view of a distortion curve when the light having the wavelength of 587.6 nm is projected in the photographing optical lens assembly in FIG. 5A;

FIG. 6B is a schematic view of longitudinal spherical aberration curves when the lights having wavelengths of 486.1 nm, 587.6 nm, and 656.3 nm are respectively projected in the photographing optical lens assembly in FIG. 6A;

FIG. 6C is a schematic view of astigmatic field curves when the light having the wavelength of 587.6 nm is projected in the photographing optical lens assembly in FIG. 6A;

FIG. 6D is a schematic view of a distortion curve when the light having the wavelength of 587.6 nm is projected in the photographing optical lens assembly in FIG. 6A;

FIG. 7B is a schematic view of longitudinal spherical aberration curves when the lights having wavelengths of 486.1 nm, 587.6 nm, and 656.3 nm are respectively projected in the photographing optical lens assembly in FIG. 7A;

FIG. 7C is a schematic view of astigmatic field curves when the light having the wavelength of 587.6 nm is projected in the photographing optical lens assembly in FIG. 7A;

FIG. 7D is a schematic view of a distortion curve when the light having the wavelength of 587.6 nm is projected in the photographing optical lens assembly in FIG. 7A;

FIG. 8B is a schematic view of longitudinal spherical aberration curves when the lights having wavelengths of 486.1 nm, 587.6 nm, and 656.3 nm are respectively projected in the photographing optical lens assembly in FIG. 8A;

FIG. 8C is a schematic view of astigmatic field curves when the light having the wavelength of 587.6 nm is projected in the photographing optical lens assembly in FIG. 8A;

FIG. 8D is a schematic view of a distortion curve when the light having the wavelength of 587.6 nm is projected in the photographing optical lens assembly in FIG. 8A;

FIG. 9B is a schematic view of longitudinal spherical aberration curves when the lights having wavelengths of 486.1 nm, 587.6 nm, and 656.3 nm are respectively projected in the photographing optical lens assembly in FIG. 9A;

FIG. 9C is a schematic view of astigmatic field curves when the light having the wavelength of 587.6 nm is projected in the photographing optical lens assembly in FIG. 9A; and FIG. 9D is a schematic view of a distortion curve when the light having the wavelength of 587.6 nm is projected in the photographing optical lens assembly in FIG. 9A.

DETAILED DESCRIPTION

Figure 1A:
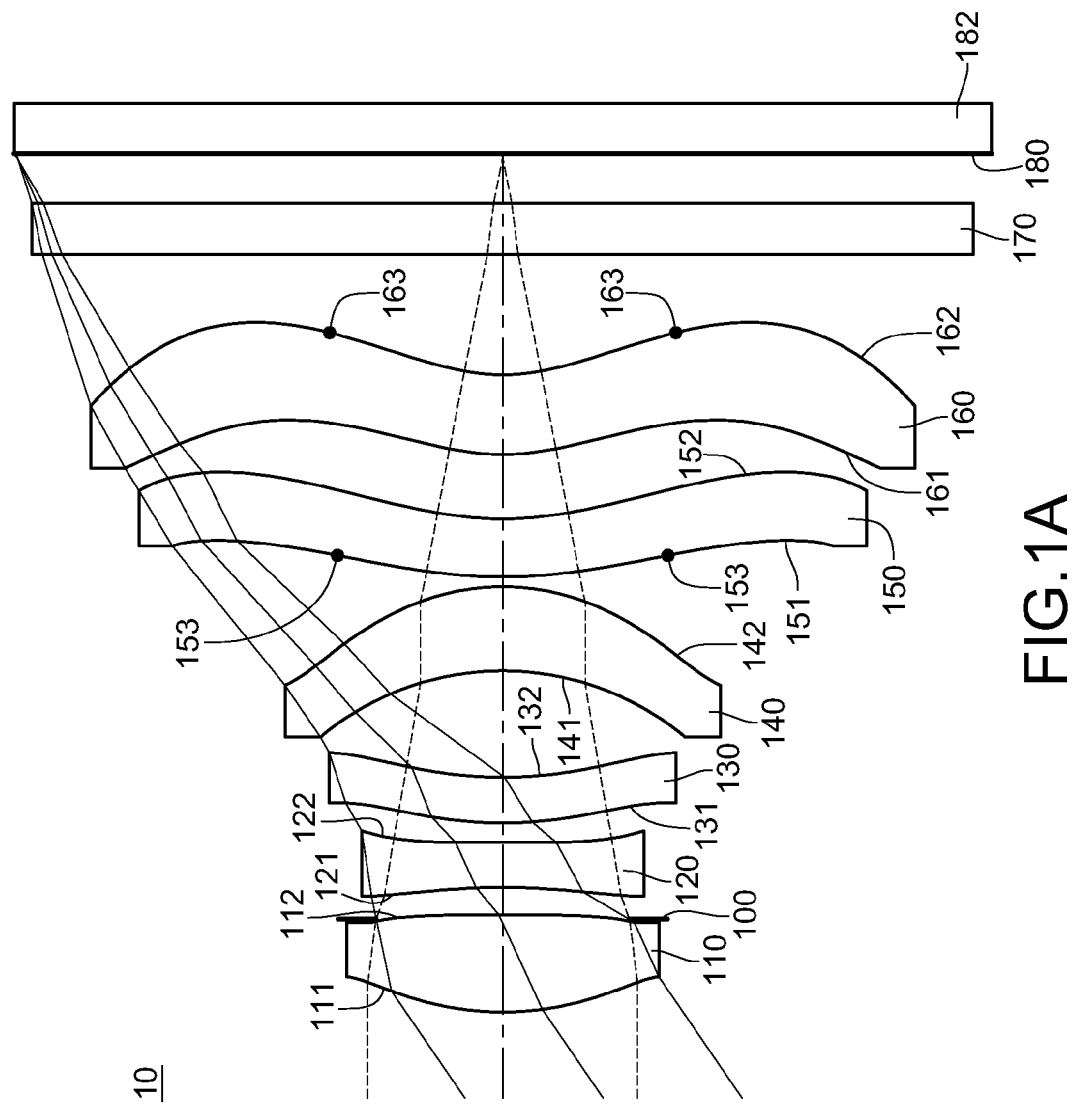
FIG. 1A is a schematic structural view of a first embodiment of a photographing optical lens assembly.

The photographing optical lens assembly of the present disclosure is described with FIG. 1A as an example, to illustrate that the embodiments have similar lens combinations, configuration relationships, and the same conditions of the optical lens assembly. The differences are described in detail in the following embodiments other than the embodiment described in FIG. 1.

Taking FIG. 1A as an example, the photographing optical lens assembly 10 comprises, from an object side to an image side along an optical axis (from left to right in FIG. 1A) in sequence, a first lens element 110, a second lens element 120, a third lens element 130, a fourth lens element 140, a fifth lens element 150, and a sixth lens element 160.

The first lens element 110 with positive refractive power provides part of the refractive power needed by the photographing optical lens assembly 10, and, therefore, helps reduce the total optical length of the photographing optical lens assembly 10. The first lens element 110 comprises a convex object-side surface 111 and an image-side surface 112. When the object-side surface 111 is convex, the positive refractive power of the first lens element 110 is increased which reduces the total optical length of the photographing optical lens assembly 10. The first lens element 110 is made of plastic, and the object-side surface 111 and the image-side surface 112 are both aspheric.

The second lens element 120 with negative refractive power corrects the aberration of the photographing optical lens assembly 10. The second lens element 120 comprises an object-side surface 121 and an image-side surface 122. The second lens element 120 is made of plastic, and the object-side surface 121 and the image-side surface 122 are both aspheric.

The third lens element 130 with positive refractive power may reduce the sensitivity of the photographing optical lens assembly 10. The third lens element 130 comprises an object-side surface 131 and an image-side surface 132. The image-side surface 132 is concave for correcting the aberration. The third lens element 130 is made of plastic, and both the object-side surface 131 and the image-side surface 132 are aspheric.

The fourth lens element 140 comprises a concave object-side surface 141 and a convex image-side surface 142 for correcting the aberration of the photographing optical lens assembly 10. The fourth lens element 140 is made of plastic, and the object-side surface 141 and the image-side surface 142 are both aspheric.

The fifth lens element 150 comprises a convex object-side surface 151 and a concave image-side surface 152, thereby effectively adjusting the astigmatism of photographing optical lens assembly 10. The fifth lens element 150 is made of plastic, and the object-side surface 151 and the image-side surface 152 are both aspheric. In addition, the fifth lens element 150 has at least one inflection point. For example, the fifth lens element 150 has an inflection point 153 for reducing the angle at which the light is projected onto the image plane 150 from the off-axis field and further correcting the off-axis aberrations.

The sixth lens element 160 comprises a convex object-side surface 161 and a concave image-side surface 162. When the image-side surface 162 of the sixth element 160 is concave, the principle point is moved toward the object side and, therefore, the total optical length of the photographing optical lens assembly 10 is reduced. When the object-side surface 161 is convex with the image-side surface 162 being concave, the distortion can be corrected. The sixth lens element 160 is made of plastic, and both the object-side surface 161 and the image-side surface 162 are aspheric. In addition, the sixth lens element 160 has at least one inflection point. For example, the sixth lens element 160 has an inflection point 163 that can reduce the angle at which the light is projected onto the image plane 150 from the off-axis field and further correct the off-axis aberrations.

In the photographing optical lens assembly 10, the first lens element 110 with positive refractive power provides part of the refractive power needed by the photographing optical lens assembly 10 for reducing the total optical length. When the first lens element 110 has the convex object-side surface 111, the refractive power of the first lens element 110 can be further increased which reduces the total optical length of the photographing optical lens assembly 10. When the fourth lens element 140 has the concave object-side surface 141 and the convex image-side surface 142, the aberration and chromatism of the photographing optical lens assembly 10 are corrected. When the fifth lens element 150 has the convex object-side surface 151 and the concave image-side surface 152, the astigmatism of the photographing optical lens assembly 10 can be corrected. When the sixth lens element 160 has the concave image-side surface 162, the total optical length of the photographing optical lens assembly 10 can be effectively reduced. When the sixth lens element 160 has the convex object-side surface 161 and the concave image-side surface 162, the distortion of the photographing optical lens assembly 10 can be corrected.

Furthermore, when the fifth lens element 150 has at least one inflection point 153, the angle at which the light is projected onto an image plane 180 from the off-axis field can be reduced to further correct the off-axis aberrations. When the fifth lens element 150 and the sixth lens element 160 are made of plastic, the manufacturing cost can be reduced.

The photographing optical lens assembly 10 of the present disclosure satisfies the following condition:

$-0.3 < (R_9 - R_{10})/(R_9 + R_{10}) < 0.6$  (condition 1):

Wherein $R_9$ is the curvature radius of the object-side surface 151; $R_{10}$ is the curvature radius of the image-side surface 152.

When the photographing optical lens assembly satisfies 10 Condition 1, the object-side surface 151 and the image-side surface 152 have the proper curvature radius which effectively corrects the high order aberration in the lens assembly.

Moreover, the photographing optical lens assembly 10 further comprises an aperture stop 100 disposed in front of the second lens element 120. That is, the aperture stop 100 is on the object side of the second lens element 120. Also, the photographing optical lens assembly 10 comprises an infrared filter 170 and an image sensor 182 disposed on the image plane 180.

The photographing optical lens assembly 10 of the present disclosure may further satisfy at least one of the following conditions:

$0.8 < f/f_1 < 1.9$  (condition 2):

$0.75 < SD/TD < 1.10$  (condition 3):

$0.10 < BFL/TTL < 0.35$  (condition 4):

$0.1 < R_{12}/f < 0.5$  (condition 5):

$(T_{23}+T_{45})/T_{34} < 1.0$  (condition 6):

$TTL/ImgH < 2.5$  (condition 7):

$|f/f_4|+|f/f_5|+|f/f_6| < 1.5$  (condition 8):

$0.05 < (CT_2+CT_3)/f < 0.19$  (condition 9):

$-0.3 < (R_7-R_8)/(R_7+R_8) < 0.5$  (condition 10):

$23 < V_1 - V_2 < 40$  (condition 11):

Wherein SD is the axial distance between the aperture stop 100 and the image-side surface 162; TD is the axial distance between the object-side surface 111 and the image-side surface 162; BFL is the axial distance between the image-side surface 162 and the image plane 180; TTL is the axial distance between the object-side surface 111 and the image plane 180; $R_{12}$ is the curvature radius of the image-side surface 162; $T_{23}$ is the axial distance between the image-side surface 122 and the object-side surface 131; $T_{34}$ is the axial distance between the image-side surface 132 and the object-side surface 141; $T_{45}$ is the axial distance between the image-side surface 142 and the object-side surface 151; $CT_2$ is the axial distance between the object-side surface 121 and the image-side surface 122, i.e. the central thickness of the second lens element; $CT_3$ is the axial distance between the object-side surface 131 and the image-side surface 132, i.e. the central thickness of the third lens element; $R_7$ is the curvature radius of the object-side surface 141; $R_8$ is the curvature radius of the image-side surface 142; ImgH is half of the diagonal length of the effective photosensitive area of the image sensor 182; f is the focal length of the photographing optical lens assembly 10; $f_1$ is the focal length of the first lens element 110; $f_4$ is the focal length of the fourth lens element 140; $f_5$ is the focal length of the fifth lens element 150; $f_6$ is the focal length of the sixth lens element 160; $V_1$ is the Abbe number of the first lens element 110, and $V_2$ is the Abbe number of the second lens element 120.

When the photographing optical lens assembly 10 satisfies Condition 2, the refractive power of the first lens element 110 is appropriate which helps control the total optical length of the photographing optical lens assembly 10. When the photographing optical lens assembly 10 satisfies Condition 3, the aperture stop 100 has a proper position that provides the telecentric effect to enhance the image quality. When the photographing optical lens assembly 10 satisfies Condition 4, the back focal length is appropriate so that there is enough room for fabricating and focusing. When the photographing optical lens assembly 10 satisfies Condition 5, the total optical length of the photographing optical lens assembly 10 can be reduced. When the photographing optical lens assembly 10 satisfies Condition 6, the aberration of the photographing optical lens assembly 10 is corrected.

When the photographing optical lens assembly 10 satisfies Condition 7, the photographing optical lens assembly 10 is advantageous in miniaturization. When the photographing optical lens assembly 10 satisfies Condition 8, the refractive power of the fourth lens element 140, the fifth lens element 150, and the sixth lens element 160 are well balanced. The balanced refractive power benefits the correction of aberration and the reduction of the optical sensitivity of the photographing optical lens assembly 10. When the photographing optical lens assembly 10 satisfies Condition 9, the total optical length of the photographing optical lens assembly 10 can be reduced. When the photographing optical lens assembly 10 satisfies Condition 10, the object-side surface 141 and the image-side surface 142 have the proper curvature radius so that the aberration of the photographing optical lens assembly 10 is not excessive. When the photographing optical lens assembly 10 satisfies Condition 11, the chromatism of the photographing optical lens assembly 10 can be corrected.

Furthermore, the lenses of the photographing optical lens assembly 10 can be made of glass or plastic. If a lens is made of glass, there is more freedom in distributing the overall refractive power for the photographing optical lens assembly 10. If a lens is made of plastic, the manufacturing cost can be reduced. In addition, the surfaces of the lenses can be aspheric. Aspheric profile allows more design parameter freedom for the aberration correction which can reduce the required number of lenses to produce high quality images in the optical lens assembly, so that the total optical length of the photographing optical lens assembly 10 can be reduced effectively.

In the photographing optical lens assembly 10, a convex surface means the surface at a paraxial site is convex. A concave surface means the surface at a paraxial site is concave.

Furthermore, at least one stop (such as glare stops, field stops, or other types of stops) may be disposed within the photographing optical lens assembly 10 if necessary for eliminating the stray light, adjusting the field of view, or other improvements concerning the image quality.

As for the optical lens assembly 10, the specific schemes are further described with the following embodiments. Parameters in the embodiments are defined as follows. Fno is an f-number value of the photographing optical lens assembly, and HFOV is a half of maximal field of view in the photographing optical lens assembly 10. The aspheric surface in the embodiments may be represented by, but not limited to, the following aspheric surface equation (Condition ASP):

$$X(Y) = (Y^2/R)/(1 + \mathrm{sqrt}(1 - (1+k)*(Y/R)^2) + \sum_{i}(A_i)*(Y^i)$$

Wherein Y is the distance from the point on the curve of the aspheric surface to the optical axis, X is the height of a point on the aspheric surface at a distance Y from the optical axis relative to the tangential plane at the aspheric surface vertex, k is a conic factor, $A_i$ is an $i^{th}$ order aspheric surface coefficient, and in the embodiments, i may be, but is not limited to, 4, 6, 8, 10, 12, 14 and 16.

The First Embodiment (Embodiment 1)

FIG. 1A is a schematic structural view of the first embodiment of the photographing optical lens assembly.

In this embodiment, the first lens element 110 with positive refractive power comprises the convex object-side surface 111. The second lens element 120 has negative refractive power. The third lens element 130 with positive refractive power comprises the concave image-side surface 132. The fourth lens element 140 with positive refractive power comprises the concave object-side surface 141 and the convex image-side surface 142. The fifth lens element 150 with negative refractive power comprises the convex object-side surface 151, the concave image-side surface 152, and the inflection points 153. The sixth lens element 160 with negative refractive power comprises the convex object-side surface 161, the concave image-side surface 162, and the inflection points 163. The aperture stop 100 can be disposed between the first lens element 110 and the second lens element 120.

The detailed data of the photographing optical lens assembly 10 is as shown in Table 1-1 below:

TABLE 1-1

Embodiment 1
f = 4.07, Fno = 2.60, HFOV = 34.4 deg.

| Surface # | Member | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.688170(ASP) | 0.566 | Plastic | 1.544 | 55.9 | 3.02 |
| 2 | | −54.436600(ASP) | −0.026 | | | | |
| 3 | Ape. | Plano | 0.187 | | | | |
| 4 | Lens 2 | −3.359800(ASP) | 0.261 | Plastic | 1.632 | 23.4 | −5.81 |
| 5 | | −40.436700(ASP) | 0.113 | | | | |
| 6 | Lens 3 | 2.277470(ASP) | 0.266 | Plastic | 1.544 | 55.9 | 68.88 |
| 7 | | 2.325000(ASP) | 0.619 | | | | |
| 8 | Lens 4 | −1.676210(ASP) | 0.491 | Plastic | 1.530 | 55.8 | 8.25 |
| 9 | | −1.334830(ASP) | 0.057 | | | | |
| 10 | Lens 5 | 2.822250(ASP) | 0.338 | Plastic | 1.530 | 55.8 | −12.05 |
| 11 | | 1.876050(ASP) | 0.375 | | | | |
| 12 | Lens 6 | 1.300530(ASP) | 0.464 | Plastic | 1.530 | 55.8 | −57.20 |
| 13 | | 1.092920(ASP) | 0.700 | | | | |
| 14 | Infrared | Plano | 0.300 | Glass | 1.517 | 64.2 | — |
| 15 | | Plano | 0.290 | | | | |
| 16 | Image | Plano | — | | | | |

Note:
Reference wavelength is d-line 587.6 nm,
ASP represents aspheric

In Table 1-1, the first lens element 110, the second lens element 120, the third lens element 130, the fourth lens element 140, the fifth lens element 150, and the sixth lens element 160 can all be aspheric, and the aspheric surfaces can satisfy Condition ASP, but are not limited thereto. As for the parameters of the aspheric surfaces, reference is made to Table 1-2 below:

TABLE 1-2

Aspheric Coefficients

| Surface# | 1 | 2 | 4 | 5 |
|---|---|---|---|---|
| K | −9.94728E−01 | −1.00000E+00 | −1.00000E+01 | −1.00000E+00 |
| $A_4$ | 1.59061E−03 | −7.66451E−02 | 9.27752E−02 | 1.87048E−01 |

TABLE 1-2-continued

| Aspheric Coefficients | | | | |
|---|---|---|---|---|
| $A_6$ | 1.09469E−02 | −7.01206E−02 | −3.41956E−02 | −3.04114E−02 |
| $A_8$ | −1.46547E−01 | −5.69562E−02 | 1.13669E−01 | 2.87264E−02 |
| $A_{10}$ | 3.00673E−01 | 6.34619E−01 | −3.41332E−01 | −1.58393E−02 |
| $A_{12}$ | −5.23152E−01 | −1.07352E+00 | 2.19885E−01 | −1.04721E−01 |
| $A_{14}$ | 4.09767E−01 | −3.41685E−01 | 2.09379E−01 | 1.36113E−01 |
| $A_{16}$ | −1.59312E−01 | 1.15796E+00 | −1.66569E−01 | −1.46176E−02 |

| Surface# | 6 | 7 | 8 | 9 |
|---|---|---|---|---|
| K | −1.00000E+00 | −1.00000E+00 | −3.61596E+00 | −1.21410E+00 |
| $A_4$ | −5.38455E−02 | −2.83211E−02 | −1.06439E−01 | −4.12421E−02 |
| $A_6$ | −3.44462E−02 | −3.33608E−02 | 5.81821E−02 | 2.56195E−02 |
| $A_8$ | −2.14017E−02 | −1.31147E−02 | −1.07226E−01 | −3.19532E−02 |
| $A_{10}$ | 3.57584E−03 | 2.65328E−03 | 9.15270E−02 | 1.11242E−02 |
| $A_{12}$ | — | — | −1.17124E−03 | 8.02637E−03 |
| $A_{14}$ | — | — | −1.57509E−02 | 2.57108E−03 |
| $A_{16}$ | — | — | −4.87416E−03 | −2.59621E−03 |

| Surface# | 10 | 11 | 12 | 13 |
|---|---|---|---|---|
| K | −5.67803E+00 | −1.00000E+01 | −7.59004E+00 | −5.68534E+00 |
| $A_4$ | −2.86288E−02 | −1.52934E−04 | −6.31902E−02 | −4.25796E−02 |
| $A_6$ | 7.40712E−03 | −7.81982E−03 | 7.22119E−03 | 2.01384E−03 |
| $A_8$ | −3.90295E−03 | 5.54585E−04 | −1.85957E−04 | −5.15087E−05 |
| $A_{10}$ | 1.00887E−03 | 2.13520E−04 | — | — |
| $A_{12}$ | 2.13454E−05 | −6.99915E−07 | — | — |
| $A_{14}$ | −4.88672E−05 | −1.21257E−05 | — | — |
| $A_{16}$ | 4.74490E−06 | 1.09951E−06 | — | — |

In Table 1-1, the curvature radius, the thickness and the focal length are shown in millimeters (mm). Surface numbers 0-16 represent the surfaces sequentially arranged from the object-side to the image-side along the optical axis. "f" stands for the focal length, "Fno" is the f-number, and "HFOV" is the half field of view of this embodiment. In Table 1-2, k represents the conic coefficient of the equation of the aspheric surface profiles. A1-A16 represent the aspheric coefficients ranging from the 1st order to the 16th. All labels for Tables of the remaining embodiments share the same definitions as those in Table 1-1 and Table 1-2 of the first embodiment, and their definitions will not be stated again.

The content of Table 1-3 may be deduced from Table 1-1:

TABLE 1-3

| Embodiment 1 | | | |
|---|---|---|---|
| f(mm) | 4.07 | $(R_7 - R_8)/(R_7 + R_8)$ | 0.113 |
| Fno | 2.60 | $(R_9 - R_{10})/(R_9 + R_{10})$ | 0.201 |
| HFOV(deg.) | 34.4 | $f/f_1$ | 1.35 |
| $V_1 - V_2$ | 32.5 | $|f/f_4| + |f/f_5| + |f/f_6|$ | 0.90 |
| $(CT_2 + CT_3)/f$ | 0.13 | SD/TD | 0.85 |
| $(T_{23} + T_{45})/T_{34}$ | 0.27 | BFL/TTL | 0.24 |
| $R_{12}/f$ | 0.27 | TTL/ImgH | 1.73 |

It can be observed from Table 1-3 that $(R_9-R_{10})/(R_9+R_{10})$ satisfies Condition 1; $f/f_1$ satisfies Condition 2; SD/TD satisfies Condition 3; BFL/TTL satisfies Condition 4; $R_{12}/f$ satisfies Condition 5; $(T_{23}+T_{45})/T_{34}$ satisfies Condition 6; TTL/ImgH satisfies Condition 7; $|f/f_4|+|f/f_5|+|f/f_6|$ satisfies Condition 8; $(CT_2+CT_3)/f$ satisfies Condition 9; $(R_7-R_8)/(R_7+R_8)$ satisfies Condition 10, and $V_1-V_2$ satisfies Condition 11.

FIG. 1B is a schematic view of longitudinal spherical aberration curves when the lights having wavelengths of 486.1 nm, 587.6 nm, and 656.3 nm are respectively projected in the photographing optical lens assembly 10 in FIG. 1A. The longitudinal spherical aberration curve of the light having the wavelength of 486.1 nm in the photographing optical lens assembly 10 is indicated by a solid line L in FIG. 1B. The longitudinal spherical aberration curve of the light having the wavelength of 587.6 nm in the photographing optical lens assembly 10 is indicated by a dashed line M in FIG. 1B. The longitudinal spherical aberration curve of the light having the wavelength of 656.3 nm in the photographing optical lens assembly 10 is indicated by a dotted line N in FIG. 1B. Horizontal axis is the focus position (millimeter, mm), and vertical axis is the normalized entrance pupil or aperture value. In other words, the differences of the focus positions of the paraxial light (the longitudinal coordinate is close to 0) and the fringe light (the longitudinal coordinate is close to 1) on the image plane 180 can be seen from the longitudinal spherical aberration curves. It can be observed from FIG. 1B that the longitudinal spherical aberrations generated by the photographing optical lens assembly 10 are within a range of −0.025 mm to 0.040 mm.

In the second embodiment to the ninth embodiment and the schematic views of the longitudinal spherical aberration curves in FIGS. 2B, 3B, 4B, 5B, 6B, 7B, 8B, and 9B, the solid line L indicates the longitudinal spherical aberration curve of the light having the wavelength of 486.1 nm, the dashed line M indicates the longitudinal spherical aberration curve of the light having the wavelength of 587.6 nm, and the dotted line N indicates the longitudinal spherical aberration curve of the light having the wavelength of 656.3 nm, which will not be repeated herein for conciseness.

FIG. 1C is a schematic view of astigmatic field curves when the light having the wavelength of 587.6 nm is projected in the photographing optical lens assembly 10 in FIG. 1A. An astigmatic field curve of a tangential plane is a dashed line T in FIG. 1C. An astigmatic field curve of a sagittal plane is a solid line S in FIG. 1C. Horizontal axis is the focus position (mm), and vertical axis is the image height (mm). It can be observed from FIG. 1C that the astigmatic field curvature of the tangential plane is within a range of −0.010 mm to 0.025 mm, and the astigmatic field curvature of the sagittal plane is within a range of −0.025 mm to 0.015 mm.

In the second embodiment to the ninth embodiment and the schematic views of the astigmatic field curves in FIGS. 2C, 3C, 4C, 5C, 6C, 7C, 8C and 9C, the solid line S indicates the astigmatic field curve of the sagittal plane, and the dashed line T indicates the astigmatic field curve of the tangential plane, which will not be repeated herein for conciseness.

FIG. 1D is a schematic view of a distortion curve when the light having the wavelength of 587.6 nm is projected in the photographing optical lens assembly 10 in FIG. 1A. The horizontal axis is the distortion ratio (%), and the vertical axis is the image height (mm). It can be observed from FIG. 1D that the distortion ratio is within a range of 0% to 2.5%. As shown in FIGS. 1B to 1D, the photographing optical lens assembly 10, designed according to the first embodiment, is capable of effectively correcting various aberrations.

In the second embodiment to the ninth embodiment and the schematic views of the distortion curves in FIGS. 2D, 3D, 4D, 5D, 6D, 7D, 8D, and 9D, the solid line G indicates the distortion curve of the light having the wavelength of 587.6 nm, which will not be repeated herein for conciseness.

It should be noted that the distortion curves and the astigmatic field curves of the wavelength of 486.1 nm and 656.3 nm are highly similar to the distortion curve and the astigmatic field curves of the wavelength of 587.6 nm. In order to prevent the confusion of reading the curves in FIGS. 1C and 1D, the distortion curve and the astigmatic field curves of wavelengths of 486.1 nm and 656.3 nm are not shown in FIGS. 1C and 1D, and the same applies throughout the rest of the embodiments of this present disclosure.

The Second Embodiment (Embodiment 2)

Figure 2A:
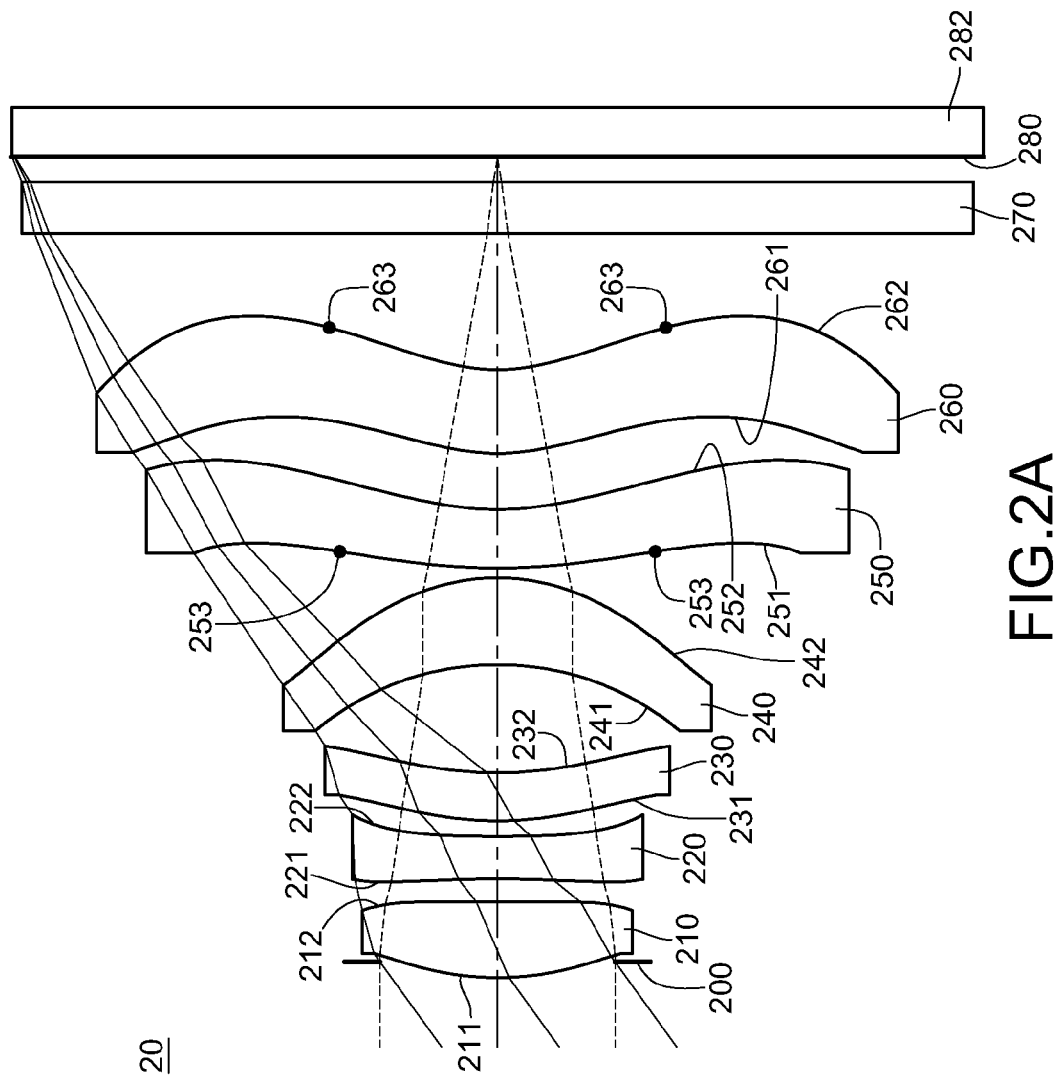
FIG. 2A is a schematic structural view of a second embodiment of a photographing optical lens assembly.

FIG. 2A is a schematic structural view of the second embodiment of the photographing optical lens assembly. The specific implementation and elements of the second embodiment are substantially the same as those in the first embodiment. The element symbols in the second embodiment all begin with "2" which correspond to those in the first embodiment with the same function or structure. For conciseness, only the differences are illustrated below, and the similarities will not be repeated herein.

In this embodiment, for example, the wavelength of the light received by the photographing optical lens assembly 20 is 587.6 nm, but this wavelength may be adjusted according to actual requirements, and is not limited to the wavelength value mentioned above.

In this embodiment, a first lens element 210 with positive refractive power comprises a convex object-side surface 211. A second lens element 220 has negative refractive power. A third lens element 230 with positive refractive power comprises a concave image-side surface 232. A fourth lens element 240 with positive refractive power comprises a concave object-side surface 241 and a convex image-side surface 242. A fifth lens element 250 with negative refractive power comprises a convex object-side surface 251, a concave image-side surface 252 and two inflection points 253. A sixth lens element 260 with negative refractive power comprises a convex object-side surface 261, a concave image-side surface 262 and two inflection points 263. An aperture stop 200 can be disposed between the first lens element 210 and the object.

The detailed data of the photographing optical lens assembly 20 is as shown in Table 2-1 below:

TABLE 2-1

Embodiment 2
f = 3.86, Fno = 2.80, HFOV = 35.9 deg.

| Surface # | Member | Curvature radius (mm) | Thickness (mm) | Material | Index | Abbe # | Focal length |
|---|---|---|---|---|---|---|---|
| 0 | Object | Plano | Infinity | | | | |
| 1 | Ape. | Plano | −0.093 | | | | |
| 2 | Lens 1 | 1.651590(ASP) | 0.444 | Plastic | 1.544 | 55.9 | 3.38 |
| 3 | | 14.723500(ASP) | 0.136 | | | | |
| 4 | Lens 2 | −5.931600(ASP) | 0.250 | Plastic | 1.634 | 23.8 | −6.23 |
| 5 | | 12.012100(ASP) | 0.090 | | | | |
| 6 | Lens 3 | 1.925990(ASP) | 0.283 | Plastic | 1.544 | 55.9 | 17.72 |
| 7 | | 2.282220(ASP) | 0.633 | | | | |
| 8 | Lens 4 | −1.777020(ASP) | 0.511 | Plastic | 1.530 | 55.8 | 5.25 |
| 9 | | −1.192140(ASP) | 0.057 | | | | |
| 10 | Lens 5 | 3.474500(ASP) | 0.344 | Plastic | 1.583 | 30.2 | −5.89 |
| 11 | | 1.663960(ASP) | 0.329 | | | | |
| 12 | Lens 6 | 1.188600(ASP) | 0.491 | Plastic | 1.530 | 55.8 | 321.46 |
| 13 | | 1.025680(ASP) | 0.800 | | | | |
| 14 | Infrared | Plano | 0.300 | Glass | 1.517 | 64.2 | — |
| 15 | | Plano | 0.151 | | | | |
| 16 | Image | Plano | — | | | | |

Note:
Reference wavelength is d-line 587.6 nm,
ASP represents aspheric.

In Table 2-1, from the first lens element 210 to the sixth lens element 260, all lens elements can be aspheric, and the aspheric surfaces can satisfy Condition ASP, but are not limited thereto. As for the parameters of the aspheric surfaces, reference is made to Table 2-2 below.

TABLE 2-2

| Aspheric Coefficients | | | | |
|---|---|---|---|---|
| Surface# | 2 | 3 | 4 | 5 |
| K | −1.33270E+00 | −1.00000E+00 | −1.00000E+01 | −1.00000E+00 |
| $A_4$ | −7.85373E−03 | −1.28677E−01 | 1.04817E−01 | 1.65890E−01 |

TABLE 2-2-continued

| Aspheric Coefficients | | | | |
|---|---|---|---|---|
| $A_6$ | 7.31073E−03 | −4.82706E−02 | −9.02634E−02 | −1.54308E−02 |
| $A_8$ | −2.20177E−01 | −2.60324E−01 | 1.78923E−01 | 5.57066E−02 |
| $A_{10}$ | 2.79474E−01 | 8.55972E−01 | −2.59450E−01 | 1.04990E−02 |
| $A_{12}$ | −5.23152E−01 | −1.07352E+00 | 2.19885E−01 | −1.04721E−01 |
| $A_{14}$ | 4.09850E−01 | −3.41665E−01 | 2.09379E−01 | 1.36113E−01 |
| $A_{16}$ | −1.59291E−01 | 1.15796E+00 | −1.66574E−01 | −1.46176E−02 |

| Surface# | 6 | 7 | 8 | 9 |
|---|---|---|---|---|
| K | −1.29262E+00 | −1.09322E+00 | −1.75889E+00 | −1.36744E+00 |
| $A_4$ | −8.17675E−02 | −3.27659E−02 | −9.75451E−02 | −3.84290E−02 |
| $A_6$ | −1.81690E−02 | −3.84875E−02 | 8.22654E−02 | 2.50924E−02 |
| $A_8$ | −1.07739E−02 | −6.41439E−03 | −1.12449E−01 | −3.24423E−02 |
| $A_{10}$ | 1.48959E−02 | 1.48897E−02 | 8.24219E−02 | 1.03709E−02 |
| $A_{12}$ | 5.53488E−03 | 1.34841E−03 | −7.49772E−03 | 7.64481E−03 |
| $A_{14}$ | −2.81837E−08 | −1.52594E−03 | −1.61432E−02 | 2.34446E−03 |
| $A_{16}$ | — | — | 2.49426E−03 | −2.77081E−03 |

| Surface# | 10 | 11 | 12 | 13 |
|---|---|---|---|---|
| K | −4.37850E+00 | −9.94436E+00 | −7.49068E+00 | −5.81520E+00 |
| $A_4$ | −2.95037E−02 | −3.44326E−03 | −6.32326E−02 | −4.14803E−02 |
| $A_6$ | 5.75210E−03 | −5.53589E−03 | 7.84310E−03 | 1.96140E−03 |
| $A_8$ | −4.01662E−03 | 2.16183E−04 | −2.20731E−04 | −9.00605E−05 |
| $A_{10}$ | 9.85076E−04 | 1.76276E−04 | — | — |
| $A_{12}$ | 1.69675E−05 | 2.49445E−06 | — | — |
| $A_{14}$ | −4.99459E−05 | −1.10618E−05 | — | — |
| $A_{16}$ | 4.85710E−06 | 1.29914E−06 | — | — |

The content of Table 2-3 may be deduced from Table 2-1.

TABLE 2-3

Embodiment 2

| f(mm) | 3.86 | $(R_7 − R_8)/(R_7 + R_8)$ | 0.197 |
|---|---|---|---|
| Fno | 2.80 | $(R_9 − R_{10})/(R_9 + R_{10})$ | 0.352 |
| HFOV(deg.) | 35.9 | $f/f_1$ | 1.14 |
| $V_1 − V_2$ | 32.1 | $|f/f_4| + |f/f_5| + |f/f_6|$ | 1.40 |
| $(CT_2 + CT_3)/f$ | 0.14 | SD/TD | 0.97 |
| $(T_{23} + T_{45})/T_{34}$ | 0.23 | BFL/TTL | 0.24 |
| $R_{12}/f$ | 0.27 | TTL/ImgH | 1.66 |

Figures 2B, 2C, 2D:
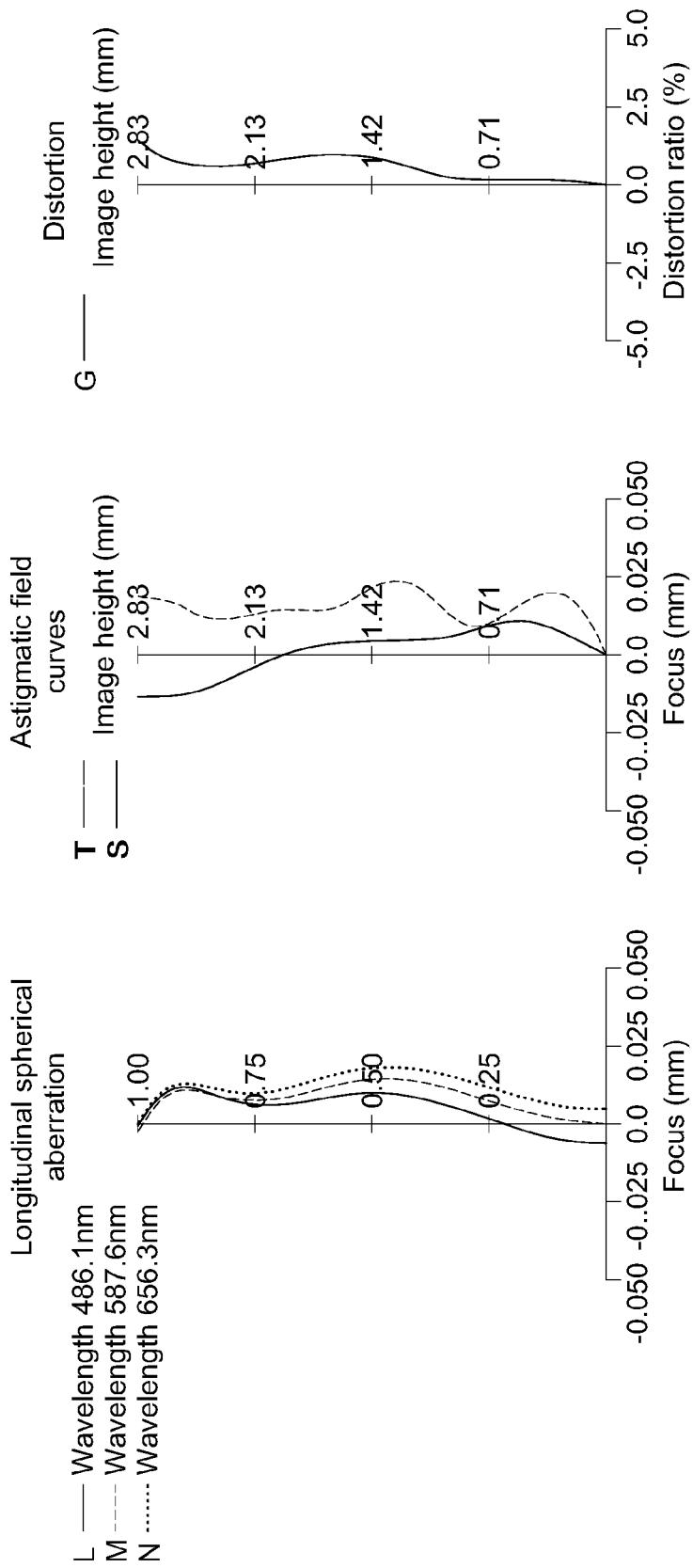
FIG. 2B is a schematic view of longitudinal spherical aberration curves when the lights having wavelengths of 486.1 nm, 587.6 nm, and 656.3 nm are respectively projected in the photographing optical lens assembly in FIG. 2A.
FIG. 2C is a schematic view of astigmatic field curves when the light having the wavelength of 587.6 nm is projected in the photographing optical lens assembly in FIG. 2A.
FIG. 2D is a schematic view of a distortion curve when the light having the wavelength of 587.6 nm is projected in the photographing optical lens assembly.

FIG. 2B is a schematic view of longitudinal spherical aberration curves of the photographing optical lens assembly 20. It can be observed from FIG. 2B that the longitudinal spherical aberrations generated by the photographing optical lens assembly 20 are within a range of −0.010 mm to 0.025 mm.

FIG. 2C is a schematic view of astigmatic field curves of the photographing optical lens assembly 20. It can be observed from FIG. 2C that the astigmatic field curvature of the tangential plane is within a range of 0.00 mm to 0.025 mm, and the astigmatic field curvature of the sagittal plane is within a range of −0.025 mm to 0.015 mm.

FIG. 2D is a schematic view of a distortion curve of the photographing optical lens assembly 20. It can be observed from FIG. 2D that the distortion ratio is within a range of 0.0% to 2.5%. As shown in FIGS. 2B to 2D, the photographing optical lens assembly 20, designed according to the second embodiment, is capable of effectively correcting various aberrations.

The Third Embodiment (Embodiment 3)

Figure 3A:
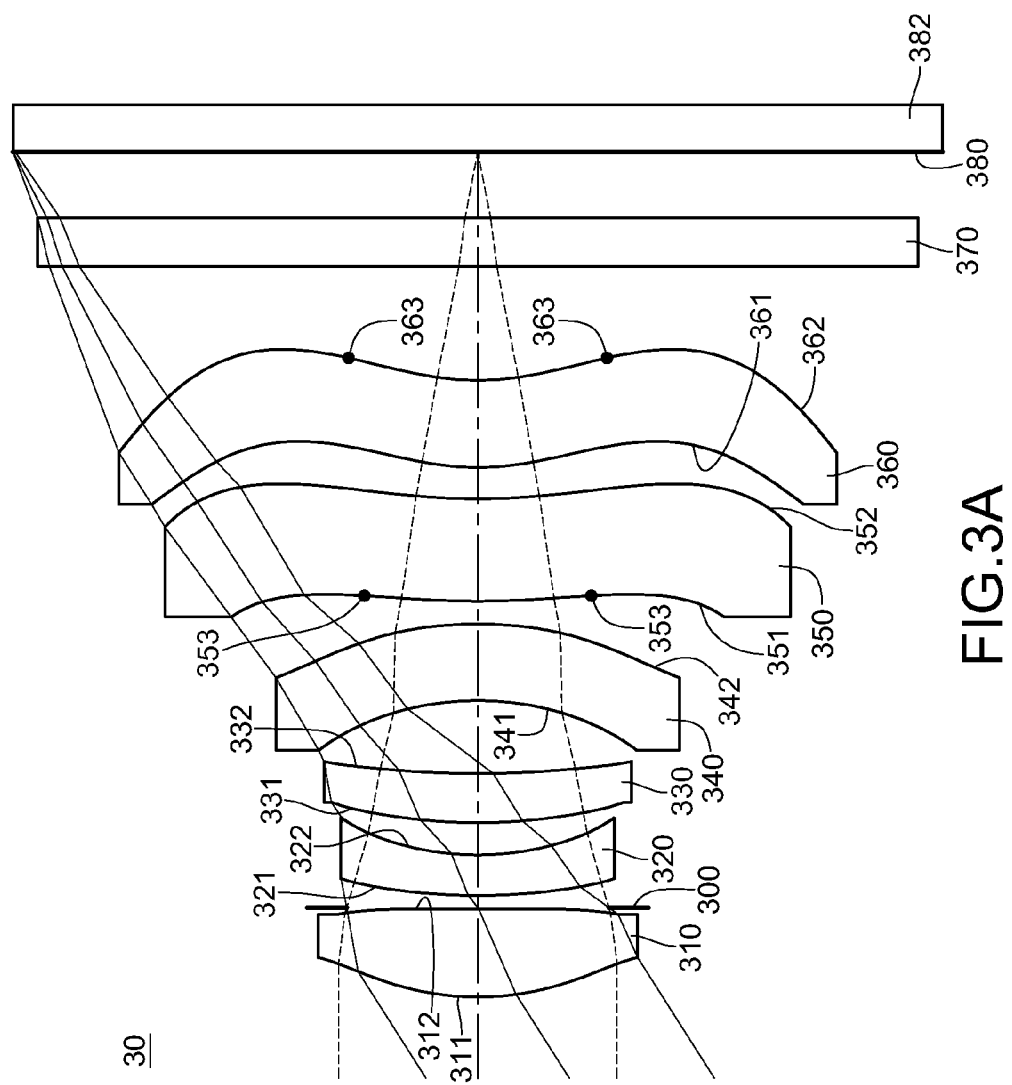
FIG. 3A is a schematic structural view of a third embodiment of an photographing optical lens assembly.

FIG. 3A is a schematic structural view of the third embodiment of the photographing optical lens assembly. The specific implementation and elements of the third embodiment are substantially the same as those in the first embodiment. The element symbols in the third embodiment all begin with "3" which correspond to those in the first embodiment with the same function or structure. For conciseness, only the differences are illustrated below, and the similarities will not be repeated herein.

In this embodiment, for example, the wavelength of the light received by the photographing optical lens assembly 30 is 587.6 nm, but the wavelength may be adjusted according to actual requirements, and is not limited to the wavelength value mentioned above.

In this embodiment, a first lens element 310 with positive refractive power comprises a convex object-side surface 311. A second lens element 320 has negative refractive power. A third lens element 330 with positive refractive power comprises a concave image-side surface 332. A fourth lens element 340 with negative refractive power comprises a concave object-side surface 341 and a convex image-side surface 342. A fifth lens element 350 with negative refractive power comprises a convex object-side surface 351, a concave image-side surface 352, and two inflection points 353. A sixth lens element 360 with positive refractive power comprises a convex object-side surface 361, a concave image-side surface 362, and two inflection points 363. An aperture stop 300 can be disposed between the first lens element 310 and the second lens element 320.

The detailed data of the photographing optical lens assembly 30 is as shown in Table 3-1 below.

TABLE 3-1

Embodiment 3
f = 4.46 mm, Fno = 2.60, HFOV = 32.5 deg.

| Surface # | Member | Curvature radius (mm) | Thickness (mm) | Material | Index | Abbe # | Focal length |
|---|---|---|---|---|---|---|---|
| 0 | Object | Plano | Infinity | | | | |
| 1 | Lens 1 | 1.685240(ASP) | 0.542 | Plastic | 1.544 | 55.9 | 3.16 |

TABLE 3-1-continued

Embodiment 3
f = 4.46 mm, Fno = 2.60, HFOV = 32.5 deg.

| Surface # | Member | Curvature radius (mm) | Thickness (mm) | Material | Index | Abbe # | Focal length |
|---|---|---|---|---|---|---|---|
| 2 | | 76.290300(ASP) | 0.008 | | | | |
| 3 | Ape. | Plano | 0.075 | | | | |
| 4 | Lens 2 | 3.495700(ASP) | 0.250 | Plastic | 1.632 | 23.4 | −5.96 |
| 5 | | 1.763320(ASP) | 0.199 | | | | |
| 6 | Lens 3 | 3.387500(ASP) | 0.302 | Plastic | 1.544 | 55.9 | 14.14 |
| 7 | | 5.860500(ASP) | 0.448 | | | | |
| 8 | Lens 4 | −1.881460(ASP) | 0.472 | Plastic | 1.632 | 23.4 | −14.62 |
| 9 | | −2.591980(ASP) | 0.141 | | | | |
| 10 | Lens 5 | 5.193800(ASP) | 0.630 | Plastic | 1.544 | 55.9 | −39.85 |
| 11 | | 4.011100(ASP) | 0.193 | | | | |
| 12 | Lens 6 | 1.583190(ASP) | 0.536 | Plastic | 1.544 | 55.9 | 25.02 |
| 13 | | 1.577780(ASP) | 0.700 | | | | |
| 14 | IR-filter | Plano | 0.300 | Glass | 1.517 | 64.2 | — |
| 15 | | Plano | 0.406 | | | | |
| 16 | Image | Plano | — | | | | |

Note:
Reference wavelength is d-line 587.6 nm,
ASP represents aspheric

In Table 3-1, from the first lens element 310 to the sixth lens element 360, all lens elements can be aspheric, and the aspheric surfaces can satisfy Condition ASP, but are not limited thereto. As for the parameters of the aspheric surfaces, reference is made to Table 3-2 below.

TABLE 3-2

Aspheric Coefficients

| Surface# | 1 | 2 | 4 | 5 |
|---|---|---|---|---|
| K | −5.32817E−01 | −1.00000E+00 | −1.00000E+01 | −2.81013E+00 |
| $A_4$ | −5.69598E−03 | −5.26592E−02 | −2.22636E−02 | 3.73435E−02 |
| $A_6$ | −2.46613E−02 | 2.74979E−03 | 9.05107E−02 | 3.98767E−02 |
| $A_8$ | 3.58648E−03 | −3.12279E−02 | −5.80411E−02 | 1.10009E−01 |
| $A_{10}$ | −3.85316E−02 | −1.31973E−02 | 1.64120E−02 | −1.75759E−01 |
| $A_{12}$ | 5.47527E−04 | 1.40366E−02 | 3.60695E−02 | 1.43017E−01 |

| Surface# | 6 | 7 | 8 | 9 |
|---|---|---|---|---|
| K | −1.00000E+00 | −1.00000E+00 | −4.09418E−01 | 2.34374E+00 |
| $A_4$ | −1.28260E−02 | −6.41027E−03 | −4.28663E−02 | −6.88771E−02 |
| $A_6$ | −3.25173E−03 | −1.67201E−02 | 1.78059E−02 | 7.75948E−02 |
| $A_8$ | 9.28602E−03 | 2.22358E−03 | −3.08921E−02 | −2.04321E−02 |
| $A_{10}$ | 3.55072E−02 | 1.38083E−02 | 3.57849E−02 | 8.85034E−03 |
| $A_{12}$ | −1.63569E−05 | 1.07848E−02 | −2.63837E−02 | −8.60488E−04 |

| Surface# | 10 | 11 | 12 | 13 |
|---|---|---|---|---|
| K | 2.34521E+00 | 0.00000E+00 | −5.68341E+00 | −5.03798E+00 |
| $A_4$ | −5.97523E−02 | −4.17290E−02 | −8.48349E−02 | −7.29846E−02 |
| $A_6$ | 1.52538E−03 | −2.28651E−03 | 6.46958E−03 | 8.14468E−03 |
| $A_8$ | 7.06467E−04 | 5.45892E−04 | 3.20023E−04 | −1.41081E−03 |
| $A_{10}$ | −8.21833E−04 | 6.26931E−06 | −3.00675E−05 | 7.09856E−05 |
| $A_{12}$ | −5.62729E−05 | −3.30350E−05 | 5.48489E−06 | 2.07934E−05 |
| $A_{14}$ | — | — | — | −1.66400E−06 |

The content of Table 3-3 may be deduced from Table 3-1.

TABLE 3-3

Embodiment 3

| f(mm) | 4.46 | $(R_7 − R_8)/(R_7 + R_8)$ | −0.159 |
|---|---|---|---|
| Fno | 2.60 | $(R_9 − R_{10})/(R_9 + R_{10})$ | 0.128 |
| HFOV(deg.) | 32.5 | $f/f_1$ | 1.41 |
| $V_1 − V_2$ | 32.5 | $|f/f_4| + |f/f_5| + |f/f_6|$ | 0.60 |
| $(CT_2 + CT_3)/f$ | 0.12 | SD/TD | 0.86 |

TABLE 3-3-continued

Embodiment 3

| $(T_{23} + T_{45})/T_{34}$ | 0.76 | BFL/TTL | 0.26 |
|---|---|---|---|
| $R_{12}/f$ | 0.35 | TTL/ImgH | 1.79 |

FIG. 3B is a schematic view of longitudinal spherical aberration curves of the photographing optical lens assembly 30. It can be observed from FIG. 3B that the longitudinal spherical aberrations generated by the photographing optical lens assembly 30 are within a range of −0.010 mm to 0.025 mm.

FIG. 3C is a schematic view of astigmatic field curves of the photographing optical lens assembly 30. It can be observed from FIG. 3C that the astigmatic field curvature of the tangential plane is within a range of 0.0 mm to 0.025 mm, and the astigmatic field curvature of the sagittal plane is within a range of −0.015 mm to 0.005 mm.

FIG. 3D is a schematic view of a distortion curve of the photographing optical lens assembly 30. It can be observed from FIG. 3D that the distortion ratio is within a range of −1.0% to 1.0%. As shown in FIGS. 3B to 3D, the photographing optical lens assembly 30, designed according to the third embodiment, is capable of effectively correcting various aberrations.

The Fourth Embodiment (Embodiment 4)

Figure 4A:
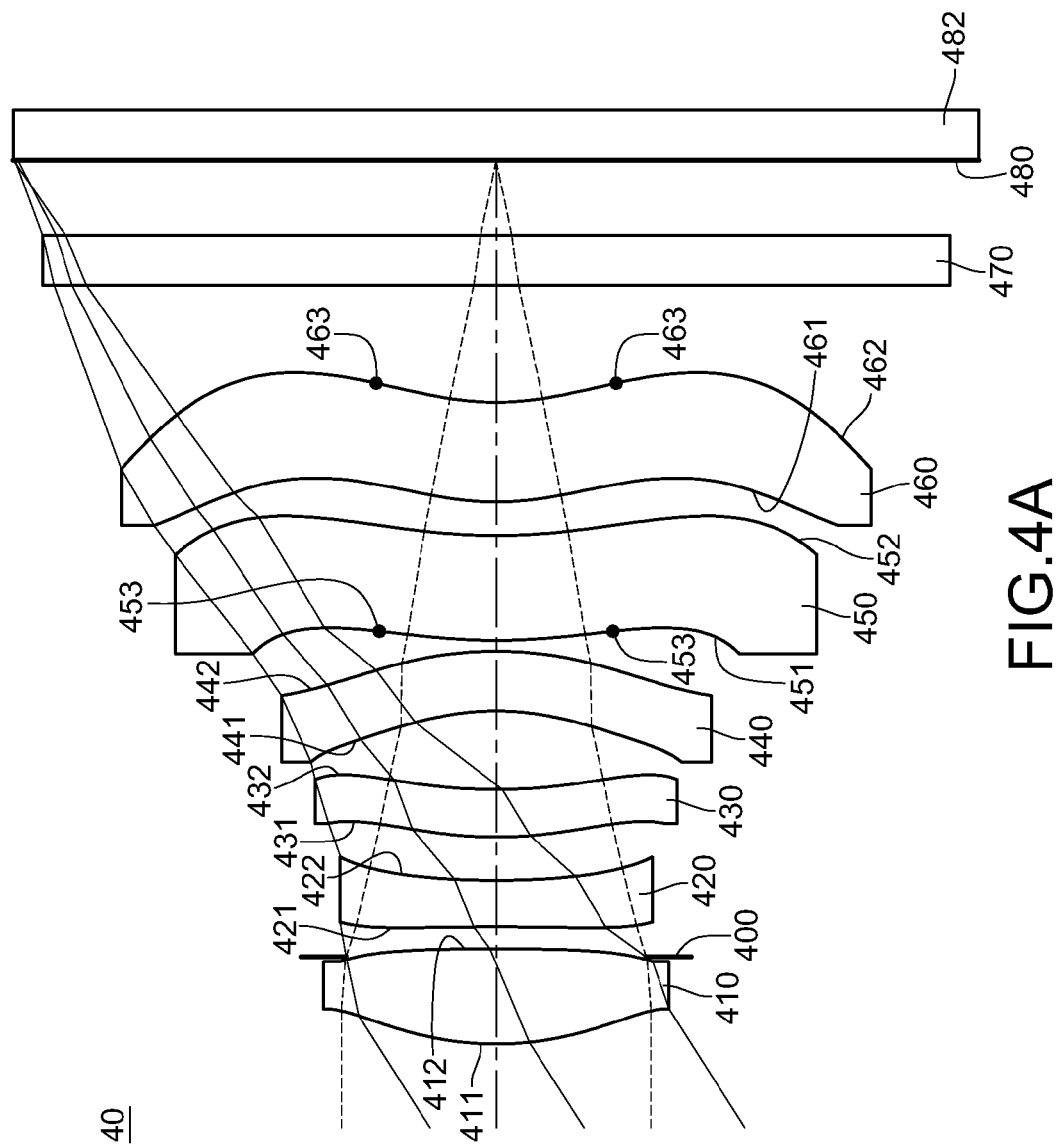
FIG. 4A is a schematic structural view of a fourth embodiment of a photographing optical lens assembly.

FIG. 4A is a schematic structural view of the fourth embodiment of the photographing optical lens assembly. The specific implementation and elements of the fourth embodiment are substantially the same as those in the first embodiment. The element symbols in the fourth embodiment all begin with "4" which correspond to those in the first embodiment with the same function or structure. For conciseness, only the differences are illustrated below, and the similarities will not be repeated herein.

In this embodiment, for example, the wavelength of the light received by the photographing optical lens assembly 40 is 587.6 nm, but the wavelength may be adjusted according to actual requirements, and is not limited to the wavelength value mentioned above.

In this embodiment, a first lens element 410 with positive refractive power comprises a convex object-side surface 411. A second lens element 420 has negative refractive power. A third lens element 430 with positive refractive power comprises a concave image-side surface 432. A fourth lens element 440 with negative refractive power comprises a concave object-side surface 441 and a convex image-side surface 442. A fifth lens element 450 with positive refractive power comprises a convex object-side surface 451, a concave image-side surface 452, and two inflection points 453. A sixth lens element 460 with positive refractive power comprises a convex object-side surface 461, a concave image-side surface 462, and two inflection points 463. An aperture stop 400 can be disposed between the first lens element 410 and the second lens element 420.

The detailed data of the photographing optical lens assembly 40 is as shown in Table 4-1 below.

TABLE 4-1

Embodiment 4
f = 4.46 mm, Fno = 2.60, HFOV = 32.5 deg.

| Surface# | Member | Curvature radius (mm) | Thickness (mm) | Material | Index | Abbe # | Focal length |
|---|---|---|---|---|---|---|---|
| 0 | Object | Plano | Infinity | | | | |
| 1 | Lens 1 | 1.834910(ASP) | 0.570 | Plastic | 1.544 | 55.9 | 3.15 |
| 2 | | −23.488200(ASP) | −0.049 | | | | |
| 3 | Ape. | Plano | 0.180 | | | | |
| 4 | Lens 2 | −18.656700(ASP) | 0.278 | Plastic | 1.632 | 23.4 | −5.97 |
| 5 | | 4.757800(ASP) | 0.259 | | | | |
| 6 | Lens 3 | 2.347300(ASP) | 0.284 | Plastic | 1.544 | 55.9 | 16.03 |
| 7 | | 3.074800(ASP) | 0.470 | | | | |
| 8 | Lens 4 | −1.580330(ASP) | 0.357 | Plastic | 1.632 | 23.4 | −10.73 |
| 9 | | −2.240680(ASP) | 0.065 | | | | |
| 10 | Lens 5 | 3.406000(ASP) | 0.627 | Plastic | 1.544 | 55.9 | 129.21 |
| 11 | | 3.347200(ASP) | 0.200 | | | | |
| 12 | Lens 6 | 1.591620(ASP) | 0.596 | Plastic | 1.544 | 55.9 | 22.48 |
| 13 | | 1.588290(ASP) | 0.700 | | | | |
| 14 | IR-filter | Plano | 0.300 | Glass | 1.517 | 64.2 | — |
| 15 | | Plano | 0.449 | | | | |
| 16 | Image | Plano | — | | | | |

Note:
Reference wavelength is d-line 587.6 nm

In Table 4-1, from the first lens element 410 to the sixth lens element 460, all lenses can be aspheric, and the aspheric surfaces can satisfy Condition ASP, but are not limited thereto. As for the parameters of the aspheric surfaces, reference is made to Table 4-2 below.

TABLE 4-2

| | Aspheric Coefficients | | | |
|---|---|---|---|---|
| Surface# | 1 | 2 | 4 | 5 |
| K | −6.59310E−01 | −1.00000E+00 | 0.00000E+00 | −1.92119E+01 |
| $A_4$ | −9.33154E−03 | −5.99498E−02 | 3.56275E−04 | 2.01891E−02 |
| $A_6$ | −2.82703E−02 | −1.04837E−02 | 1.07852E−01 | 5.59198E−02 |
| $A_8$ | −6.36889E−03 | 9.21343E−03 | −4.23176E−02 | 1.28756E−01 |
| $A_{10}$ | −2.64375E−02 | −3.54169E−02 | −2.17657E−02 | −2.55367E−01 |
| $A_{12}$ | 5.55531E−04 | 1.40931E−02 | 3.60678E−02 | 1.43016E−01 |

TABLE 4-2-continued

| Aspheric Coefficients | | | | |
|---|---|---|---|---|
| Surface# | 6 | 7 | 8 | 9 |
| K | −1.00000E+00 | −1.00000E+00 | −3.06731E+00 | 9.71501E−01 |
| $A_4$ | −9.76301E−02 | −1.95864E−02 | 2.52984E−02 | −8.07438E−03 |
| $A_6$ | −1.01631E−02 | −5.59234E−02 | 4.11863E−02 | 8.44757E−02 |
| $A_8$ | −2.71467E−02 | 1.24840E−02 | −3.81793E−02 | −3.20353E−02 |
| $A_{10}$ | 7.90390E−03 | −1.65455E−02 | 2.45770E−02 | 6.68380E−03 |
| $A_{12}$ | −3.66838E−03 | −6.26253E−04 | −2.34361E−02 | −2.64461E−04 |
| Surface# | 10 | 11 | 12 | 13 |
| K | −1.76892E+00 | 0.00000+00 | −7.70613E+00 | −6.69083E+00 |
| $A_4$ | −7.09127E−02 | −5.46082E−02 | −8.39249E−02 | −6.76588E−02 |
| $A_6$ | 2.70982E−03 | 2.71610E−03 | 9.14098E−03 | 9.24683E−03 |
| $A_8$ | 6.68203E−04 | −2.58205E−04 | 5.01978E−04 | −1.51491E−03 |
| $A_{10}$ | −1.93334E−03 | −1.85881E−04 | −4.07349E−05 | 6.33452E−05 |
| $A_{12}$ | −2.43560E−04 | 2.15888E−05 | −5.73868E−06 | 1.98123E−05 |
| $A_{14}$ | — | — | — | −1.50566E−06 |

The content of Table 4-3 may be deduced from Table 4-1.

TABLE 4-3

| Embodiment 4 | | | |
|---|---|---|---|
| f(mm) | 4.44 | $(R_7 − R_8)/(R_7 + R_8)$ | −0.173 |
| Fno | 2.40 | $(R_9 − R_{10})/(R_9 + R_{10})$ | 0.009 |
| HFOV(deg.) | 32.5 | $f/f_1$ | 1.41 |
| $V_1 − V_2$ | 32.5 | $|f/f_4| + |f/f_5| + |f/f_6|$ | 0.65 |
| $(CT_2 + CT_3)/f$ | 0.13 | SD/TD | 0.86 |
| $(T_{23} + T_{45})/T_{34}$ | 0.69 | BFL/TTL | 0.26 |
| $R_{12}/f$ | 0.36 | TTL/ImgH | 1.82 |

FIG. 4B is a schematic view of longitudinal spherical aberration curves of the photographing optical lens assembly 40. It can be observed from FIG. 4B that the longitudinal spherical aberrations generated by the photographing optical lens assembly 40 are within a range of −0.005 mm to 0.050 mm.

FIG. 4C is a schematic view of astigmatic field curves of the photographing optical lens assembly 40. It can be observed from FIG. 4C that the astigmatic field curvature of the tangential plane is within a range of 0.0 mm to 0.040 mm, and the astigmatic field curvature of the sagittal plane is within a range of −0.005 mm to 0.015 mm.

FIG. 4D is a schematic view of a distortion curve of the photographing optical lens assembly 40. It can be observed from FIG. 4D that the distortion ratio is within a range of 0.0% to 2.0%. As shown in FIGS. 4B to 4D, the photographing optical lens assembly 40, designed according to the fourth embodiment, is capable of effectively correcting various aberrations.

The Fifth Embodiment (Embodiment 5)

Figure 5A:
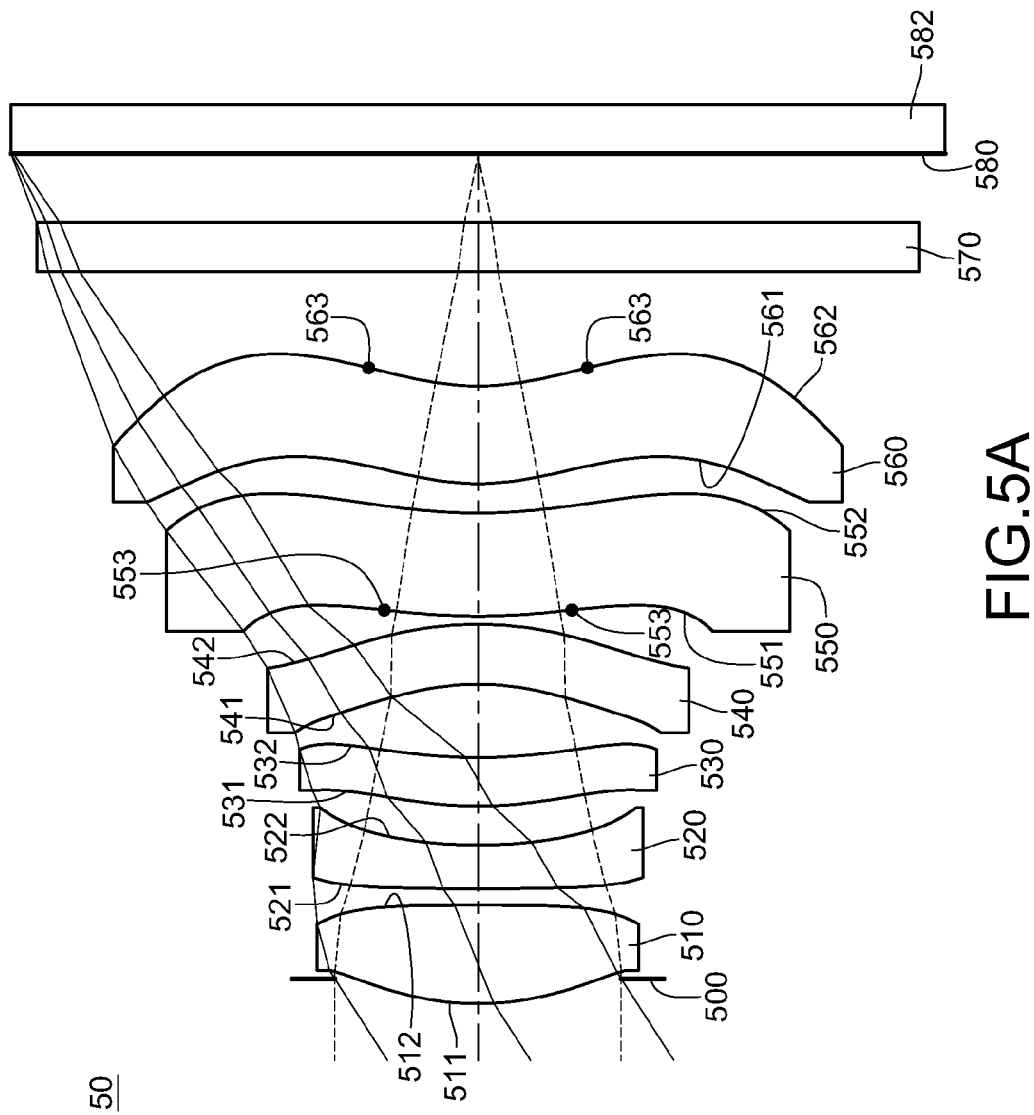
FIG. 5A is a schematic structural view of a fifth embodiment of a photographing optical lens assembly.

FIG. 5A is a schematic structural view of the fifth embodiment of the photographing optical lens assembly. The specific implementation and elements of the fifth embodiment are substantially the same as those in the first embodiment. The element symbols in the fifth embodiment all begin with "5" which correspond to those in the first embodiment with the same function or structure. For conciseness, only the differences are illustrated below, and the similarities will not be repeated herein.

In this embodiment, for example, the wavelength of the light received by the photographing optical lens assembly 50 is 587.6 nm, but the wavelength may be adjusted according to actual requirements, and is not limited to the wavelength value mentioned above.

In this embodiment, a first lens element 510 with positive refractive power comprises a convex object-side surface 511. A second lens element 520 has negative refractive power. A third lens element 530 with positive refractive power comprises a concave image-side surface 532. A fourth lens element 540 with negative refractive power comprises a concave object-side surface 541 and a convex image-side surface 542. A fifth lens element 550 with positive refractive power comprises a convex object-side surface 551, a concave image-side surface 552, and two inflection points 553. A sixth lens element 560 with positive refractive power comprises a convex object-side surface 561, a concave image-side surface 562, and two inflection points 563. An aperture stop 500 can be disposed between the first lens element 510 and the object-side of the optical axis (Left side of FIG. 5A).

The detailed data of the photographing optical lens assembly 50 is as shown in Table 5-1 below.

TABLE 5-1

Embodiment 5
f = 4.44 mm, Fno = 2.40, HFOV = 32.5 deg.

| Surface# | Member | Curvature Radius (mm) | Thickness (mm) | Material | Index | Abbe # | Focal length |
|---|---|---|---|---|---|---|---|
| 0 | Object | Plano | Infinity | | | | |
| 1 | Ape. | Plano | −0.153 | | | | |
| 2 | Lens 1 | 1.757050(ASP) | 0.603 | Plastic | 1.544 | 55.9 | 3.13 |
| 3 | | −46.769700(ASP) | 0.100 | | | | |
| 4 | Lens 2 | 20.071600(ASP) | 0.268 | Plastic | 1.634 | 23.8 | −5.47 |
| 5 | | 2.941720(ASP) | 0.239 | | | | |
| 6 | Lens 3 | 2.384770(ASP) | 0.298 | Plastic | 1.544 | 55.9 | 13.55 |
| 7 | | 3.370000(ASP) | 0.448 | | | | |
| 8 | Lens 4 | −1.591540(ASP) | 0.367 | Plastic | 1.634 | 23.8 | −11.82 |

TABLE 5-1-continued

Embodiment 5
f = 4.44 mm, Fno = 2.40, HFOV = 32.5 deg.

| Surface# | Member | Curvature Radius (mm) | Thickness (mm) | Material | Index | Abbe # | Focal length |
|---|---|---|---|---|---|---|---|
| 9 |  | −2.201410(ASP) | 0.050 |  |  |  |  |
| 10 | Lens 5 | 3.669800(ASP) | 0.632 | Plastic | 1.535 | 56.3 | −125.11 |
| 11 |  | 3.270200(ASP) | 0.180 |  |  |  |  |
| 12 | Lens 6 | 1.482020(ASP) | 0.598 | Plastic | 1.535 | 56.3 | 18.50 |
| 13 |  | 1.498180(ASP) | 0.700 |  |  |  |  |
| 14 | IR-filter | Plano | 0.300 | Glass | 1.517 | 64.2 | — |
| 15 |  | Plano | 0.424 |  |  |  |  |
| 16 | Image | Plano | — |  |  |  |  |

Note:
Reference wavelength is d-line 587.6 nm

In Table 5-1, from the first lens element 510 to the sixth lens element 560, all lenses can be aspheric, and the aspheric surfaces can satisfy Condition ASP, but are not limited thereto. As for the parameters of the aspheric surfaces, reference is made to Table 5-2 below.

TABLE 5-2

Aspheric Coefficients

| Surface# | 2 | 3 | 4 | 5 |
|---|---|---|---|---|
| K | −4.85962E−01 | −1.00000E+00 | 0.00000E+00 | −5.45107E+00 |
| $A_4$ | −4.63259E−03 | −6.17626E−02 | −1.59077E−02 | 1.75524E−02 |
| $A_6$ | −5.05585E−02 | −4.40404E−02 | 8.33807E−02 | 6.82135E−02 |
| $A_8$ | 4.05358E−02 | 2.23783E−02 | −3.61055E−02 | 1.46519E−01 |
| $A_{10}$ | −7.01338E−02 | −4.77831E−02 | −2.61487E−02 | −2.68630E−01 |
| $A_{12}$ | 4.73320E−04 | 1.40268E−02 | 3.66720E−02 | 1.43013E−01 |

| Surface# | 6 | 7 | 8 | 9 |
|---|---|---|---|---|
| K | −1.00000E+00 | −1.00000E+00 | −3.15023E+00 | 8.80274E−01 |
| $A_4$ | −9.32067E−02 | −1.49040E−02 | 2.75514E−02 | −4.85834E−03 |
| $A_6$ | −9.50051E−03 | −5.53285E−02 | 4.47192E−02 | 8.40273E−02 |
| $A_8$ | −2.15526E−02 | 1.50415E−02 | −3.75321E−02 | −3.24794E−02 |
| $A_{10}$ | 1.18681E−02 | −1.52880E−02 | 2.38437E−02 | 6.65014E−03 |
| $A_{12}$ | −1.63627E−03 | −2.50960E−03 | −2.24794E−02 | −2.60572E−04 |

| Surface# | 10 | 11 | 12 | 13 |
|---|---|---|---|---|
| K | −9.77209E−01 | 0.00000E+00 | −6.30485E+00 | −5.82976E+00 |
| $A_4$ | −6.90338E−02 | −5.62897E−02 | −8.62534E−02 | −6.89849E−02 |
| $A_6$ | 1.35993E−03 | 2.87583E−03 | 9.10119E−03 | 9.04722E−03 |
| $A_8$ | −1.39334E−04 | −2.88743E−04 | 4.78809E−04 | −1.48731E−03 |
| $A_{10}$ | −1.94710E−03 | −1.86205E−04 | −3.94985E−05 | 6.59309E−05 |
| $A_{12}$ | −2.18586E−04 | 2.26306E−05 | −4.55811E−06 | 1.98644E−05 |
| $A_{14}$ | — | — | — | −1.53882E−06 |

The content of Table 5-3 may be deduced from Table 5-1.

TABLE 5-3

Embodiment 5

| f(mm) | 4.38 | $(R_7 - R_8)/(R_7 + R_8)$ | −0.161 |
|---|---|---|---|
| Fno | 2.50 | $(R_9 - R_{10})/(R_9 + R_{10})$ | 0.058 |
| HFOV(deg.) | 32.8 | $f/f_1$ | 1.40 |
| $V_1 - V_2$ | 32.1 | $|f/f_4| + |f/f_5| + |f/f_6|$ | 0.64 |
| $(CT_2 + CT_3)/f$ | 0.13 | SD/TD | 0.96 |
| $(T_{23} + T_{45})/T_{34}$ | 0.65 | BFL/TTL | 0.26 |
| $R_{12}/f$ | 0.34 | TTL/ImgH | 1.79 |

FIG. 5B is a schematic view of longitudinal spherical aberration curves of the photographing optical lens assembly 50. It can be observed from FIG. 5B that the longitudinal spherical aberrations generated by the photographing optical lens assembly 50 are within a range of 0.0 mm to 0.040 mm.

FIG. 5C is a schematic view of astigmatic field curves of the photographing optical lens assembly 50. It can be observed from FIG. 5C that the astigmatic field curvature of the tangential plane is within a range of 0.005 mm to 0.040 mm, and the astigmatic field curvature of the sagittal plane is within a range of 0.0 mm to 0.015 mm.

FIG. 5D is a schematic view of a distortion curve of the photographing optical lens assembly 50. It can be observed from FIG. 5D that the distortion ratio is within a range of 0.0% to 1.5%. As shown in FIGS. 5B to 5D, the photographing optical lens assembly 50, designed according to the fifth embodiment, is capable of effectively correcting various aberrations.

The Sixth Embodiment (Embodiment 6)

Figure 6A:
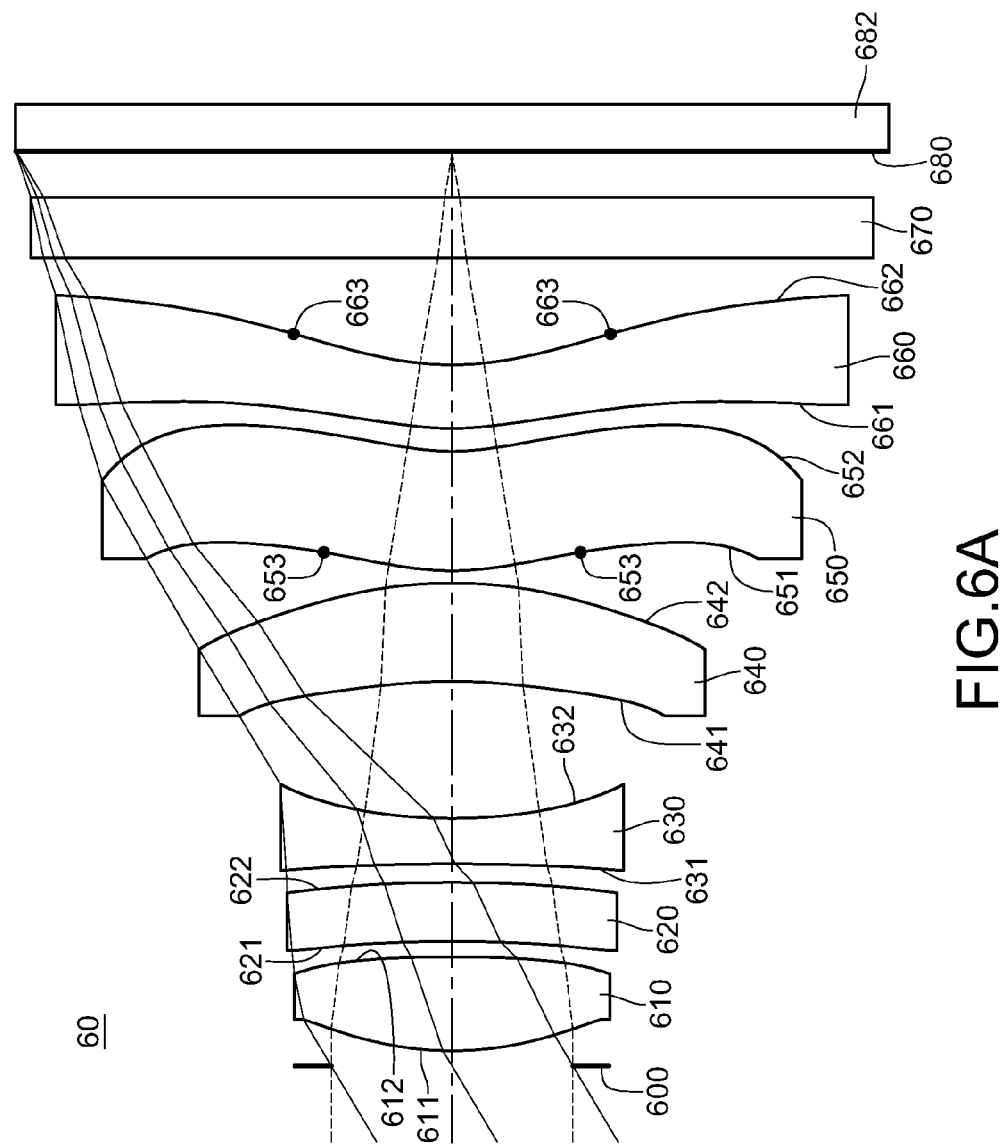
FIG. 6A is a schematic structural view of a sixth embodiment of a photographing optical lens assembly.

FIG. 6A is a schematic structural view of the sixth embodiment of the photographing optical lens assembly. The specific implementation and elements of the sixth embodiment are substantially the same as those in the first embodiment. The element symbols in the sixth embodiment all begin with "6" which correspond to those in the first embodiment with the same function or structure. For conciseness, only the differences are illustrated below, and the similarities will not be repeated herein.

In this embodiment, for example, the wavelength of the light received by the photographing optical lens assembly 60 is 587.6 nm, but the wavelength may be adjusted according to actual requirements, and is not limited to the wavelength value mentioned above.

In this embodiment, a first lens element 610 with positive refractive power comprises a convex object-side surface 611. A second lens element 620 has positive refractive power. A third lens element 630 with negative refractive power comprises a concave image-side surface 632. A fourth lens element 640 with positive refractive power comprises a concave object-side surface 641 and a convex image-side surface 642. A fifth lens element 650 with negative refractive power comprises a convex object-side surface 651, a concave image-side surface 652, and two inflection points 653. A sixth lens element 660 with positive refractive power comprises a convex object-side surface 661, a concave image-side surface 662, and two inflection points 663. An aperture stop 600 can be disposed between the first lens element 610 and the object-side of the optical axis (Left side of FIG. 6A).

The detailed data of the photographing optical lens assembly 60 is as shown in Table 6-1 below.

TABLE 6-1

Embodiment 6
f = 4.75 mm, Fno = 3.00, HFOV = 30.8 deg.

| Surface# | Member | Curvature Radius (mm) | Thickness (mm) | Material | Index | Abbe # | Focal length |
|---|---|---|---|---|---|---|---|
| 0 | Object | Plano | Infinity | | | | |
| 1 | Ape. | Plano | 0.100 | | | | |
| 2 | Lens 1 | 2.152490(ASP) | 0.617 | Plastic | 1.544 | 55.9 | 3.21 |
| 3 | | −8.328200(ASP) | 0.100 | | | | |
| 4 | Lens 2 | −9.423200(ASP) | 0.388 | Plastic | 1.632 | 23.4 | 171.31 |
| 5 | | −8.807200(ASP) | 0.120 | | | | |
| 6 | Lens 3 | −17.167700(ASP) | 0.300 | Plastic | 1.614 | 25.6 | −4.85 |
| 7 | | 3.625500(ASP) | 0.899 | | | | |
| 8 | Lens 4 | −3.121100(ASP) | 0.644 | Plastic | 1.530 | 55.8 | 77.93 |
| 9 | | −3.109200(ASP) | 0.081 | | | | |
| 10 | Lens 5 | 1.796700(ASP) | 0.784 | Plastic | 1.530 | 55.8 | −59.68 |
| 11 | | 1.443150(ASP) | 0.150 | | | | |
| 12 | Lens 6 | 1.759260(ASP) | 0.417 | Plastic | 1.544 | 55.9 | 18.59 |
| 13 | | 1.951780(ASP) | 0.700 | | | | |
| 14 | IR-filter | Plano | 0.400 | Glass | 1.517 | 64.2 | — |
| 15 | | Plano | 0.302 | | | | |
| 16 | Image | Plano | — | | | | |

Note:
Reference wavelength is d-line 587.6 nm

In Table 6-1, from the first lens element 610 to the sixth lens element 660, all lens elements can be aspheric, and the aspheric surfaces can satisfy Condition ASP, but are not limited thereto. As for the parameters of the aspheric surfaces, reference is made to Table 6-2 below.

TABLE 6-2

Aspheric Coefficients

| Surface# | 2 | 3 | 4 | 5 |
|---|---|---|---|---|
| K | −5.30262E−01 | −3.35619E+01 | −5.69788E+01 | −1.59941E+00 |
| $A_4$ | −3.52973E−03 | −1.50932E−02 | −4.46232E−03 | −1.83378E−03 |
| $A_6$ | −1.62487E−03 | −2.91399E−02 | −2.29821E−02 | 3.13611E−04 |
| $A_8$ | −1.93803E−02 | −1.36497E−02 | 1.91527E−03 | −7.18608E−04 |
| $A_{10}$ | −2.91580E−04 | 1.06037E−02 | 1.86133E−02 | −1.63033E−04 |
| $A_{12}$ | — | — | −3.35756E−03 | — |

| Surface# | 6 | 7 | 8 | 9 |
|---|---|---|---|---|
| K | 9.13723E+01 | 1.87261E+00 | −3.03803E+01 | 3.62127E−01 |
| $A_4$ | −5.69047E−04 | 2.65235E−02 | 3.31423E−02 | −1.44260E−02 |
| $A_6$ | −9.27822E−05 | −3.18407E−02 | −4.31940E−02 | 2.18114E−02 |
| $A_8$ | 1.69487E−04 | 3.84778E−02 | 1.95554E−02 | −4.20389E−03 |
| $A_{10}$ | −1.04122E−03 | −1.88278E−02 | −4.38054E−03 | −5.80357E−04 |
| $A_{12}$ | — | 4.71828E−03 | −4.06202E−04 | 1.10720E−04 |

| Surface# | 10 | 11 | 12 | 13 |
|---|---|---|---|---|
| K | −9.77778E+00 | −1.95351E+01 | −3.05852E+01 | −4.65636E+00 |
| $A_4$ | −5.99117E−02 | −3.18215E−02 | −1.19530E−02 | −2.36748E−02 |
| $A_6$ | 1.69295E−02 | 8.11310E−03 | 6.01147E−04 | 2.24707E−03 |
| $A_8$ | −4.09539E−04 | −1.79669E−03 | 2.02782E−05 | 5.01172E−05 |

TABLE 6-2-continued

| Aspheric Coefficients | | | | |
|---|---|---|---|---|
| $A_{10}$ | −8.62579E−04 | 1.31304E−04 | 7.63863E−06 | −1.04778E−05 |
| $A_{12}$ | 1.18682E−04 | −4.93833E−06 | 1.02917E−06 | −4.84331E−07 |
| $A_{14}$ | −2.47769E−06 | — | −2.61860E−07 | 5.75116E−09 |

The content of Table 6-3 may be deduced from Table 6-1.

TABLE 6-3

| Embodiment 6 | | | |
|---|---|---|---|
| f(mm) | 4.75 | $(R_7 − R_8)/(R_7 + R_8)$ | 0.002 |
| Fno | 3.00 | $(R_9 − R_{10})/(R_9 + R_{10})$ | 0.109 |
| HFOV(deg.) | 30.8 | $f/f_1$ | 1.48 |
| $V_1 − V_2$ | 32.5 | $|f/f_4| + |f/f_5| + |f/f_6|$ | 0.40 |
| $(CT_2 + CT_3)/f$ | 0.14 | SD/TD | 1.02 |
| $(T_{23} + T_{45})/T_{34}$ | 0.22 | BFL/TTL | 0.22 |
| $R_{12}/f$ | 0.41 | TTL/ImgH | 2.02 |

FIG. 6B is a schematic view of longitudinal spherical aberration curves of the photographing optical lens assembly 60. It can be observed from FIG. 6B that the longitudinal spherical aberrations generated by the photographing optical lens assembly 60 are within a range of −0.025 mm to 0.015 mm.

FIG. 6C is a schematic view of astigmatic field curves of the photographing optical lens assembly 60. It can be observed from FIG. 6C that the astigmatic field curvature of the tangential plane is within a range of −0.025 mm to 0.020 mm, and the astigmatic field curvature of the sagittal plane is within a range of −0.025 mm to 0.015 mm.

FIG. 6D is a schematic view of a distortion curve of the photographing optical lens assembly 60. It can be observed from FIG. 6D that the distortion ratio is within a range of 0.0% to 2.0%. As shown in FIGS. 6B to 6D, the photographing optical lens assembly 60, designed according to the sixth embodiment, is capable of effectively correcting various aberrations.

The Seventh Embodiment (Embodiment 7)

Figure 7A:
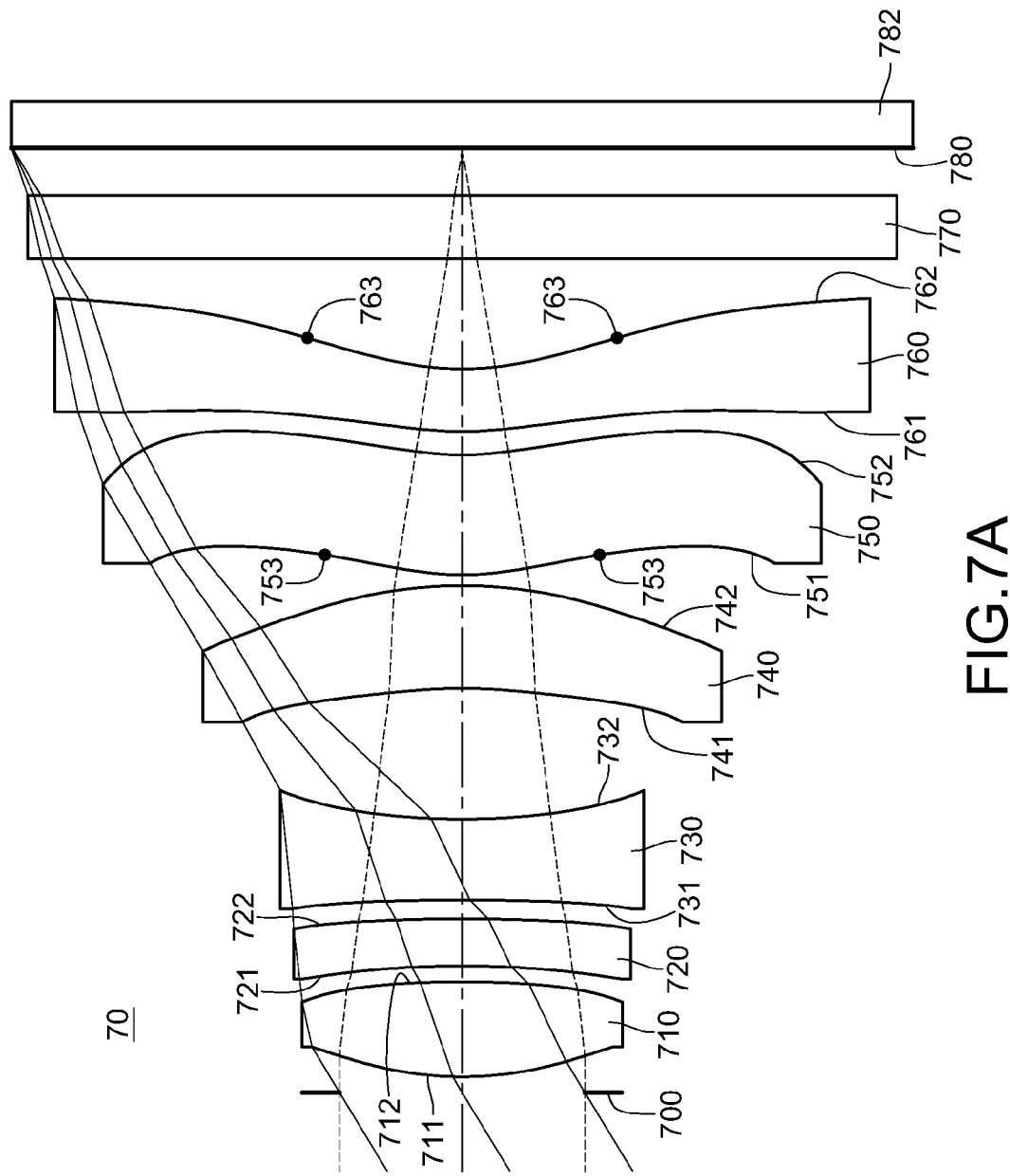
FIG. 7A is a schematic structural view of a seventh embodiment of a photographing optical lens assembly.

FIG. 7A is a schematic structural view of the seventh embodiment of the photographing optical lens assembly. The specific implementation and elements of the seventh embodiment are substantially the same as those in the first embodiment. The element symbols in the seventh embodiment all begin with "7" which correspond to those in the first embodiment with the same function or structure. For conciseness, only the differences are illustrated below, and the similarities will not be repeated herein.

In this embodiment, for example, the wavelength of the light received by the photographing optical lens assembly 70 is 587.6 nm, but the wavelength may be adjusted according to actual requirements, and is not limited to the wavelength value mentioned above.

In this embodiment, a first lens element 710 with positive refractive power comprises a convex object-side surface 711. A second lens element 720 has negative refractive power. A third lens element 730 with negative refractive power comprises a concave image-side surface 732. A fourth lens element 740 with positive refractive power comprises a concave object-side surface 741 and a convex image-side surface 742. A fifth lens element 750 with positive refractive power comprises a convex object-side surface 751, a concave image-side surface 752, and two inflection points 753. A sixth lens element 760 with positive refractive power comprises a convex object-side surface 761, a concave image-side surface 762, and two inflection points 763. An aperture stop 700 can be disposed between the first lens element 710 and the object-side of the optical axis (Left side of FIG. 7A).

The detailed data of the photographing optical lens assembly 70 is as shown in Table 7-1 below.

TABLE 7-1

Embodiment 7
f = 4.68 mm, Fno = 3.00, HFOV = 31.1 deg.

| Surface# | Member | Curvature Radius (mm) | Thickness (mm) | Material | Index | Abbe # | Focal length |
|---|---|---|---|---|---|---|---|
| 0 | Object | Plano | Infinity | | | | |
| 1 | Ape. | Plano | 0.100 | | | | |
| 2 | Lens 1 | 2.225820(ASP) | 0.604 | Plastic | 1.544 | 55.9 | 3.07 |
| 3 | | −6.077200(ASP) | 0.100 | | | | |
| 4 | Lens 2 | −6.113100(ASP) | 0.300 | Plastic | 1.583 | 30.2 | −22.90 |
| 5 | | −11.473000(ASP) | 0.120 | | | | |
| 6 | Lens 3 | −15.098400(ASP) | 0.514 | Plastic | 1.614 | 25.6 | −5.92 |
| 7 | | 4.854000(ASP) | 0.830 | | | | |
| 8 | Lens 4 | −3.152800(ASP) | 0.653 | Plastic | 1.530 | 55.8 | 43.54 |
| 9 | | −2.972800(ASP) | 0.070 | | | | |
| 10 | Lens 5 | 1.769450(ASP) | 0.760 | Plastic | 1.530 | 55.8 | 103.37 |
| 11 | | 1.556470(ASP) | 0.150 | | | | |
| 12 | Lens 6 | 1.885080(ASP) | 0.398 | Plastic | 1.544 | 55.9 | 120.22 |
| 13 | | 1.796600(ASP) | 0.700 | | | | |
| 14 | IR-filter | Plano | 0.400 | Glass | 1.517 | 64.2 | — |
| 15 | | Plano | 0.303 | | | | |
| 16 | Image | Plano | — | | | | |

Note:
Reference wavelength is d-line 587.6 nm

In Table 7-1, from the first lens element 710 to the sixth lens element 760, all lens elements can be aspheric, and the aspheric surfaces can satisfy Condition ASP, but are not limited thereto. As for the parameters of the aspheric surfaces, reference is made to Table 7-2 below.

TABLE 3

Aspheric Coefficients

| Surface# | 2 | 3 | 4 | 5 |
|---|---|---|---|---|
| K | −5.83973E−01 | −2.98477E+01 | −4.71281E+01 | −2.03759E+01 |
| $A_4$ | −4.14624E−03 | −1.70915E−02 | −5.19255E−03 | −6.53804E−04 |
| $A_6$ | −3.54169E−03 | −3.32882E−02 | −2.46471E−02 | −2.06015E−03 |
| $A_8$ | −1.95943E−02 | −1.34697E−02 | −1.55784E−03 | −3.34624E−03 |
| $A_{10}$ | −1.24628E−03 | 1.10383E−02 | 1.90500E−02 | −4.31693E−03 |
| $A_{12}$ | — | — | −2.92656E−03 | — |

| Surface# | 6 | 7 | 8 | 9 |
|---|---|---|---|---|
| K | 9.20000E+01 | 2.48916E+00 | −3.70959E+01 | 2.35999E−01 |
| $A_4$ | −3.89573E−03 | 2.89390E−02 | 3.24609E−02 | −1.38094E−02 |
| $A_6$ | 7.30086E−04 | −3.42085E−02 | −4.24020E−02 | 2.17481E−02 |
| $A_8$ | −1.11769E−03 | 3.77118E−02 | 1.92455E−02 | −4.02650E−03 |
| $A_{10}$ | −2.82471E−03 | −1.88636E−02 | −4.53275E−03 | −4.99926E−04 |
| $A_{12}$ | — | 4.80075E−03 | −2.24030E−04 | 1.32531E−04 |

| Surface# | 10 | 11 | 12 | 13 |
|---|---|---|---|---|
| K | −1.00066E+01 | −2.68667E+01 | −4.45133E+01 | −4.77362E+00 |
| $A_4$ | −6.13008E−02 | −2.62884E−02 | −1.34330E−02 | −2.61490E−02 |
| $A_6$ | 1.75182E−02 | 7.49911E−03 | 1.04975E−03 | 2.69538E−03 |
| $A_8$ | −5.06676E−04 | −1.81117E−03 | 1.85372E−05 | −9.63136E−06 |
| $A_{10}$ | −8.74977E−04 | 1.27930E−04 | 6.27454E−06 | −7.02519E−06 |
| $A_{12}$ | 1.18803E−04 | −4.19196E−06 | 1.14756E−06 | 4.11247E−07 |
| $A_{14}$ | −2.30728E−06 | — | −2.61808E−07 | −8.37336E−08 |

The content of Table 7-3 may be deduced from Table 7-1.

TABLE 7-3

Embodiment 7

| f(mm) | 4.68 | $(R_7 - R_8)/(R_7 + R_8)$ | 0.029 |
|---|---|---|---|
| Fno | 3.00 | $(R_9 - R_{10})/(R_9 + R_{10})$ | 0.064 |
| HFOV(deg.) | 31.1 | $f/f_1$ | 1.52 |
| $V_1 - V_2$ | 25.7 | $|f/f_4| + |f/f_5| + |f/f_6|$ | 0.19 |
| $(CT_2 + CT_3)/f$ | 0.17 | SD/TD | 1.02 |
| $(T_{23} + T_{45})/T_{34}$ | 0.23 | BFL/TTL | 0.22 |
| $R_{12}/f$ | 0.38 | TTL/ImgH | 2.02 |

FIG. 7B is a schematic view of longitudinal spherical aberration curves of the photographing optical lens assembly 70. It can be observed from FIG. 7B that the longitudinal spherical aberrations generated by the photographing optical lens assembly 70 are within a range of −0.025 mm to 0.010 mm.

FIG. 7C is a schematic view of astigmatic field curves of the photographing optical lens assembly 70. It can be observed from FIG. 7C that the astigmatic field curvature of the tangential plane is within a range of −0.025 mm to 0.020 mm, and the astigmatic field curvature of the sagittal plane is within a range of −0.025 mm to 0.015 mm.

FIG. 7D is a schematic view of a distortion curve of the photographing optical lens assembly 70. It can be observed from FIG. 7D that the distortion ratio is within a range of 0.0% to 1.5%. As shown in FIGS. 7B to 7D, the photographing optical lens assembly 70, designed according to the seventh embodiment, is capable of effectively correcting various aberrations.

The Eighth Embodiment (Embodiment 8)

Figure 8A:
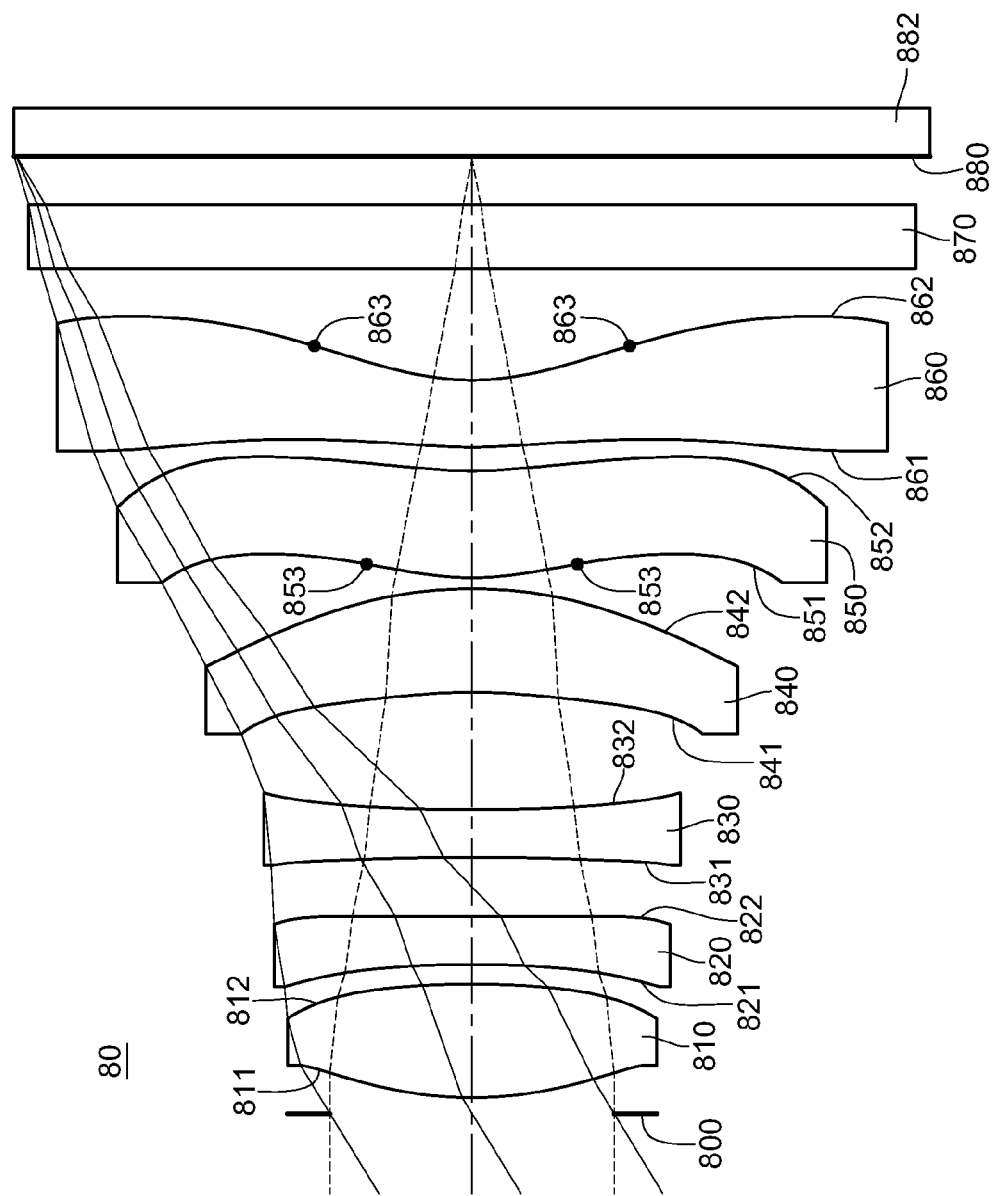
FIG. 8A is a schematic structural view of an eighth embodiment of a photographing optical lens assembly.

FIG. 8A is a schematic structural view of the eighth embodiment of the photographing optical lens assembly. The specific implementation and elements of the eighth embodiment are substantially the same as those in the first embodiment. The element symbols in the eighth embodiment all begin with "8" which correspond to those in the first embodiment with the same function or structure. For conciseness, only the differences are illustrated below, and the similarities will not be repeated herein.

In this embodiment, for example, the wavelength of the light received by the photographing optical lens assembly 80 is 587.6 nm, but the wavelength may be adjusted according to actual requirements, and is not limited to the wavelength value mentioned above.

In this embodiment, a first lens element 810 with positive refractive power comprises a convex object-side surface 811. A second lens element 820 has negative refractive power. A third lens element 830 with negative refractive power comprises a concave image-side surface 832. A fourth lens element 840 with positive refractive power comprises a concave object-side surface 841 and a convex image-side surface 842. A fifth lens element 850 with positive refractive power comprises a convex object-side surface 851, a concave image-side surface 852, and two inflection points 853. A sixth lens element 860 with negative refractive power comprises a convex object-side surface 861, a concave image-side surface 862, and two inflection points 863. An aperture stop 800 can be disposed between the first lens element 810 and the object-side of the optical axis (Left side of FIG. 8A).

The detailed data of the photographing optical lens assembly 80 is as shown in Table 8-1 below.

TABLE 8-1

Embodiment 8
f = 4.63 mm, Fno = 2.60, HFOV = 31.4 deg.

| Surface# | Member | Curvature Radius (mm) | Thickness (mm) | Material | Index | Abbe # | Focal length |
|---|---|---|---|---|---|---|---|
| 0 | Object | Plano | Infinity | | | | |
| 1 | Ape. | Plano | 0.100 | | | | |
| 2 | Lens 1 | 2.413420(ASP) | 0.712 | Glass | 1.517 | 64.2 | 3.35 |
| 3 | | −5.521300(ASP) | 0.123 | | | | |
| 4 | Lens 2 | −6.705100(ASP) | 0.300 | Plastic | 1.583 | 30.2 | −10.50 |
| 5 | | 72.067600(ASP) | 0.372 | | | | |
| 6 | Lens 3 | −19.230800(ASP) | 0.300 | Plastic | 1.614 | 25.6 | −13.77 |
| 7 | | 15.190200(ASP) | 0.735 | | | | |
| 8 | Lens 4 | −3.177700(ASP) | 0.649 | Plastic | 1.530 | 55.8 | 27.47 |
| 9 | | −2.792840(ASP) | 0.070 | | | | |
| 10 | Lens 5 | 1.761540(ASP) | 0.669 | Plastic | 1.530 | 55.8 | 10.71 |
| 11 | | 2.218620(ASP) | 0.150 | | | | |
| 12 | Lens 6 | 2.766520(ASP) | 0.420 | Plastic | 1.544 | 55.9 | −7.51 |
| 13 | | 1.561140(ASP) | 0.700 | | | | |
| 14 | IR-filter | Plano | 0.400 | Glass | 1.517 | 64.2 | — |
| 15 | | Plano | 0.304 | | | | |
| 16 | Image | Plano | — | | | | |

Note:
Reference wavelength is d-line 587.6 nm

In Table 8-1, from the first lens element 810 to the sixth lens element 860, all lens elements can be aspheric, and the aspheric surfaces can satisfy Condition ASP, but are not limited thereto. As for the parameters of the aspheric surfaces, reference is made to Table 8-2 below.

TABLE 8-2

Aspheric Coefficients

| Surface# | 2 | 3 | 4 | 5 |
|---|---|---|---|---|
| K | −6.53053E−01 | −1.74924E+01 | −2.82346E+01 | −7.70000E+01 |
| $A_4$ | −5.08112E−03 | −2.16452E−02 | −5.92365E−03 | −5.68810E−04 |
| $A_6$ | −6.49710E−03 | −2.96536E−02 | −2.62580E−02 | −5.40988E−03 |
| $A_8$ | −8.77555E−03 | −5.28819E−03 | −8.95736E−03 | −1.16380E−03 |
| $A_{10}$ | −3.55531E−03 | 3.31555E−03 | 1.89195E−02 | −3.62862E−03 |
| $A_{12}$ | — | — | −5.02605E−03 | — |

| Surface# | 6 | 7 | 8 | 9 |
|---|---|---|---|---|
| K | −2.26614E+00 | −2.09500E+00 | −5.27329E+01 | 4.01796E−01 |
| $A_4$ | −3.90888E−03 | 2.90111E−02 | 2.53046E−02 | −1.48295E−02 |
| $A_6$ | 6.08392E−03 | −3.70138E−02 | −4.12241E−02 | 1.96023E−02 |
| $A_8$ | 6.46792E−04 | 3.70935E−02 | 1.79116E−02 | −3.93335E−03 |
| $A_{10}$ | −2.87004E−03 | −1.79563E−02 | −4.91104E−03 | −3.37609E−04 |
| $A_{12}$ | — | 3.82634E−03 | 8.39015E−05 | 1.69969E−04 |

| Surface# | 10 | 11 | 12 | 13 |
|---|---|---|---|---|
| K | −1.11632E+01 | −7.23176E+01 | −1.59273E+02 | −4.85171E+00 |
| $A_4$ | −6.78877E−02 | −1.67870E−02 | −1.74539E−02 | −3.08432E−02 |
| $A_6$ | 1.85545E−02 | 5.16060E−03 | 1.80914E−03 | 3.86432E−03 |
| $A_8$ | −8.30713E−04 | −1.85847E−03 | 4.36023E−05 | −1.88848E−04 |
| $A_{10}$ | −9.31168E−04 | 1.43935E−04 | 8.57367E−06 | −1.45262E−06 |
| $A_{12}$ | 1.23587E−04 | 5.73756E−07 | 2.13791E−07 | 1.05762E−06 |
| $A_{14}$ | 4.57693E−07 | — | −3.75526E−07 | −1.46229E−07 |

The content of Table 8-3 may be deduced from Table 8-1.

TABLE 8-3

Embodiment 8

| f(mm) | 4.63 | $(R_7 - R_8)/(R_7 + R_8)$ | 0.064 |
|---|---|---|---|
| Fno | 2.60 | $(R_9 - R_{10})/(R_9 + R_{10})$ | −0.115 |
| HFOV(deg.) | 31.4 | $f/f_1$ | 1.38 |
| $V_1 - V_2$ | 34.0 | $|f/f_4| + |f/f_5| + |f/f_6|$ | 1.22 |

TABLE 8-3-continued

Embodiment 8

| $(CT_2 + CT_3)/f$ | 0.13 | SD/TD | 1.02 |
|---|---|---|---|
| $(T_{23} + T_{45})/T_{34}$ | 0.60 | BFL/TTL | 0.22 |
| $R_{12}/f$ | 0.34 | TTL/ImgH | 2.02 |

FIG. 8B is a schematic view of longitudinal spherical aberration curves of the photographing optical lens assembly 80.

It can be observed from FIG. 8B that the longitudinal spherical aberrations generated by the photographing optical lens assembly 80 are within a range of −0.025 mm to 0.010 mm.

FIG. 8C is a schematic view of astigmatic field curves of the photographing optical lens assembly 80. It can be observed from FIG. 8C that the astigmatic field curvature of the tangential plane is within a range of −0.030 mm to 0.025 mm, and the astigmatic field curvature of the sagittal plane is within a range of −0.030 mm to 0.020 mm.

FIG. 8D is a schematic view of a distortion curve of the photographing optical lens assembly 80. It can be observed from FIG. 8D that the distortion ratio is within a range of 0.0% to 2.0%. As shown in FIGS. 8B to 8D, the photographing optical lens assembly 80, designed according to the eighth embodiment, is capable of effectively correcting various aberrations.

The Ninth Embodiment (Embodiment 9)

Figure 9A:
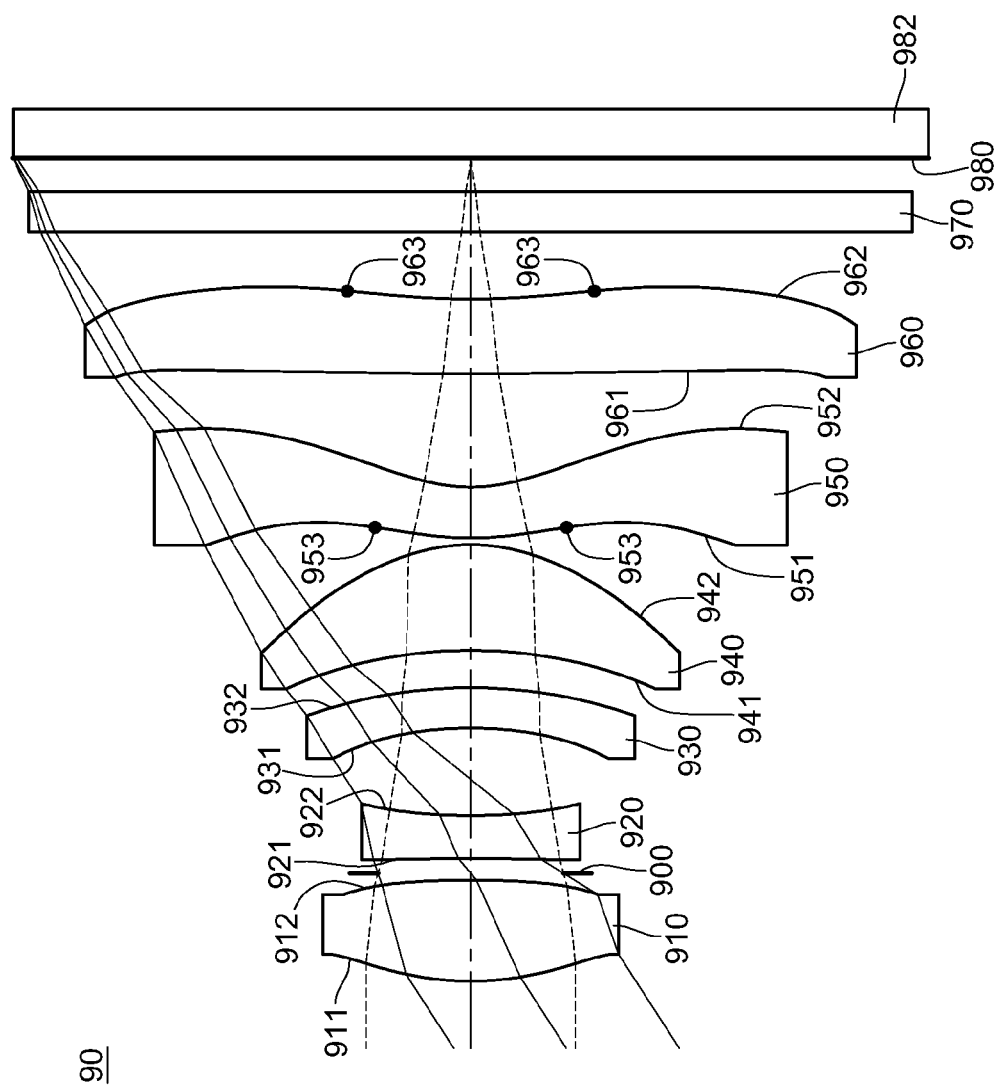
FIG. 9A is a schematic structural view of a ninth embodiment of a photographing optical lens assembly.

FIG. 9A is a schematic structural view of the ninth embodiment of the photographing optical lens assembly. The specific implementation and elements of the ninth embodiment are substantially the same as those in the first embodiment. The element symbols in the ninth embodiment all begin with "9" which correspond to those in the first embodiment with the same function or structure. For conciseness, only the differences are illustrated below, and the similarities will not be repeated herein.

In this embodiment, for example, the wavelength of the light received by the photographing optical lens assembly 90 is 587.6 nm, but the wavelength may be adjusted according to actual requirements, and is not limited to the wavelength value mentioned above.

In this embodiment, a first lens element 910 with positive refractive power comprises a convex object-side surface 911. A second lens element 920 has negative refractive power. A third lens element 930 with negative refractive power comprises a concave image-side surface 932. A fourth lens element 940 with positive refractive power comprises a concave object-side surface 941 and a convex image-side surface 942. A fifth lens element 950 with negative refractive power comprises a convex object-side surface 951, a concave image-side surface 952, and two inflection points 953. A sixth lens element 960 with negative refractive power comprises a convex object-side surface 961, a concave image-side surface 962, and two inflection points 963. An aperture stop 900 can be disposed between the first lens element 910 and the second lens element 920.

The detailed data of the photographing optical lens assembly 90 is as shown in Table 9-1 below.

TABLE 9-1

Embodiment 9
f = 4.98 mm, Fno = 3.20, HFOV = 32.8 deg.

| Surface# | Member | Curvature Radius (mm) | Thickness (mm) | Material | Index | Abbe # | Focal length |
|---|---|---|---|---|---|---|---|
| 0 | Object | Plano | Infinity | | | | |
| 1 | Lens 1 | 2.194430(ASP) | 0.753 | Plastic | 1.544 | 55.9 | 3.22 |
| 2 | | −7.616400(ASP) | 0.050 | | | | |
| 3 | Ape. | Plano | 0.110 | | | | |
| 4 | Lens 2 | −26.096800(ASP) | 0.321 | Plastic | 1.614 | 25.6 | −6.29 |
| 5 | | 4.556600(ASP) | 0.651 | | | | |
| 6 | Lens 3 | −2.862130(ASP) | 0.300 | Plastic | 1.614 | 25.6 | −23.61 |
| 7 | | −3.708100(ASP) | 0.278 | | | | |
| 8 | Lens 4 | −3.547700(ASP) | 0.787 | Plastic | 1.583 | 30.2 | 3.39 |
| 9 | | −1.374130(ASP) | 0.050 | | | | |
| 10 | Lens 5 | 2.175410(ASP) | 0.378 | Plastic | 1.632 | 23.4 | −4.78 |
| 11 | | 1.179760(ASP) | 0.846 | | | | |
| 12 | Lens 6 | 36.192500(ASP) | 0.555 | Plastic | 1.632 | 23.4 | −9.94 |
| 13 | | 5.323000(ASP) | 0.500 | | | | |
| 14 | IR-filter | Plano | 0.300 | Glass | 1.517 | 64.2 | — |
| 15 | | Plano | 0.251 | | | | |
| 16 | Image | Plano | — | | | | |

Note:
Reference wavelength is d-line 587.6 nm

In Table 9-1, from the first lens element 910 to the sixth lens element 960, all lens elements are aspheric, and the aspheric surfaces can satisfy Condition ASP, but are not limited thereto. As for the parameters of the aspheric surfaces, reference is made to Table 9-2 below.

TABLE 9-2

Aspheric Coefficients

| Surface# | 1 | 2 | 4 | 5 |
|---|---|---|---|---|
| K | −7.56384E−01 | −4.58833E+01 | −1.00000E+02 | −1.31337E+01 |
| $A_4$ | −5.26461E−03 | −4.82011E−02 | 2.71727E−03 | 4.98945E−02 |
| $A_6$ | −2.20417E−02 | −3.45321E−02 | −2.17170E−02 | −3.34814E−03 |
| $A_8$ | 1.24804E−02 | 1.28580E−02 | 2.95137E−02 | 4.92489E−03 |
| $A_{10}$ | −2.21777E−02 | −3.06938E−03 | 1.31657E−03 | 1.00627E−02 |
| $A_{12}$ | — | −3.25773E−04 | −9.63819E−04 | 4.14908E−04 |

TABLE 9-2-continued

| Aspheric Coefficients | | | | |
|---|---|---|---|---|
| Surface# | 6 | 7 | 8 | 9 |
| K | −6.82619E+00 | 9.64543E−02 | 1.20215E−02 | −2.24868E+00 |
| $A_4$ | −5.91562E−02 | −2.85195E−04 | 1.79641E−04 | −2.18579E−02 |
| $A_6$ | −4.10717E−03 | 1.64971E−04 | −7.43378E−04 | −2.05121E−03 |
| $A_8$ | 3.03064E−03 | 1.61449E−05 | −4.50620E−04 | −5.66288E−04 |
| $A_{10}$ | −3.03480E−03 | −1.74200E−04 | −1.84981E−05 | 4.08493E−04 |
| $A_{12}$ | 4.13012E−04 | — | — | 5.64212E−05 |
| Surface# | 10 | 11 | 12 | 13 |
| K | −1.41219E+01 | −4.73865E+00 | −1.00000E+00 | 1.49423E+00 |
| $A_4$ | −4.91395E−02 | −3.67593E−02 | −4.59986E−03 | −3.19344E−02 |
| $A_6$ | 3.65022E−03 | 6.12007E−03 | 9.37229E−04 | 2.51865E−03 |
| $A_8$ | 4.63033E−04 | −5.94934E−04 | −7.38096E−06 | 7.15866E−05 |
| $A_{10}$ | −6.10779E−05 | 8.96944E−06 | −1.21675E−05 | −2.06759E−05 |
| $A_{12}$ | 5.74835E−06 | 2.47353E−06 | — | −4.87548E−07 |
| $A_{14}$ | — | — | — | 5.96384E−08 |

The content of Table 9-3 may be deduced from Table 9-1.

TABLE 9-3

| Embodiment 9 | | | |
|---|---|---|---|
| f(mm) | 4.98 | $(R_7 − R_8)/(R_7 + R_8)$ | 0.442 |
| Fno | 3.20 | $(R_9 − R_{10})/(R_9 + R_{10})$ | 0.297 |
| HFOV(deg.) | 32.8 | $f/f_1$ | 1.55 |
| $V_1 − V_2$ | 30.3 | $|f/f_4| + |f/f_5| + |f/f_6|$ | 3.01 |
| $(CT_2 + CT_3)/f$ | 0.12 | SD/TD | 0.84 |
| $(T_{23} + T_{45})/T_{34}$ | 2.52 | BFL/TTL | 0.16 |
| $R_{12}/f$ | 1.07 | TTL/ImgH | 1.77 |

FIG. 9B is a schematic view of longitudinal spherical aberration curves of the photographing optical lens assembly 90. It can be observed from FIG. 9B that the longitudinal spherical aberrations generated by the photographing optical lens assembly 90 are within a range of −0.025 mm to 0.035 mm.

FIG. 9C is a schematic view of astigmatic field curves of the photographing optical lens assembly 90. It can be observed from FIG. 9C that the astigmatic field curvature of the tangential plane is within a range of −0.015 mm to 0.100 mm, and the astigmatic field curvature of the sagittal plane is within a range of −0.025 mm to 0.015 mm.

FIG. 9D is a schematic view of a distortion curve of the photographing optical lens assembly 90. It can be observed from FIG. 9D that the distortion ratio is within a range of 0.0% to 6.0%. As shown in FIGS. 9B to 9D, the photographing optical lens assembly 90, designed according to the ninth embodiment, is capable of effectively correcting various aberrations.

What is claimed is:

1. A photographing optical lens assembly comprising, in order from an object side to an image side:

a first lens element with positive refractive power having a convex object-side surface;

a second lens element;

a third lens element;

a fourth lens element with at least one aspheric surface;

a fifth lens element with a convex object-side surface and a concave image-side surface having at least one inflection point, and at least one of the object-side surface and the image-side surface of the fifth lens element being aspheric; and a sixth lens element with an object-side surface and a concave image-side surface, at least one of the image-side surface and the object-side surface of the sixth lens element being aspheric;

the photographing optical lens assembly satisfying the following condition:

$$-0.3 < (R_9 − R_{10})/(R_9 + R_{10}) < 0.6$$

wherein $R_9$ is a curvature radius of the object-side surface of the fifth lens element, and $R_{10}$ is a curvature radius of the image-side surface of the fifth lens element.

2. The photographing optical lens assembly according to claim 1, wherein the sixth lens element has at least one inflection point, the fifth lens element and the sixth lens element are made of plastic.

3. The photographing optical lens assembly according to claim 2, wherein the photographing optical lens assembly satisfies the following condition:

$$0.8 < f/f_1 < 1.9$$

wherein f is a focal length of the photographing optical lens assembly, and $f_1$ is a focal length of the first lens element.

4. The photographing optical lens assembly according to claim 3, further comprising a stop, and the photographing optical lens assembly satisfying the following condition:

$$0.75 < SD/TD < 1.10$$

wherein SD is an axial distance between the stop and the image-side surface of the sixth lens element, and TD is an axial distance between the object-side surface of the first lens element and the image-side surface of the sixth lens element.

5. The photographing optical lens assembly according to claim 4, further comprising an image plane, and the photographing optical lens assembly satisfying the following condition:

$$0.10 < BFL/TTL < 0.35$$

wherein BFL is a back focal length of the photographing optical lens assembly, and TTL is an axial distance between the object-side surface of the first lens element and the image plane.

6. The photographing optical lens assembly according to claim 4, wherein the object-side surface of the fourth lens element is concave, and the image-side surface of the fourth lens element is convex.

7. The photographing optical lens assembly according to claim 5, wherein the photographing optical lens assembly satisfies the following condition:

$$0.1 < R_{12}/f < 0.5$$

wherein $R_{12}$ is a curvature radius of the image-side surface of the sixth lens element, and f is a focal length of the photographing optical lens assembly.

8. The photographing optical lens assembly according to claim 5, wherein the photographing optical lens assembly satisfies the following condition:

$(T_{23}+T_{45})/T_{34}<1.0$ $T_{23}$ is an axial distance between the second lens element and the third lens element, $T_{34}$ is an axial distance between the third lens element and the fourth lens element, and $T_{45}$ is an axial distance between the fourth lens element and the fifth lens element.

9. The photographing optical lens assembly according to claim 6, further comprising an image sensor and an image plane, and the photographing optical lens assembly satisfying the following condition:

$TTL/ImgH<2.5$ wherein ImgH is one half of the diagonal length of the effective photosensitive area of the image sensor, and TTL is an axial distance between the object-side surface of the first lens element and the image plane.

10. The photographing optical lens assembly according to claim 6, wherein the refractive power of the second lens element is negative, the refractive power of the third lens element is positive, the image-side surface of the third lens element is concave, and the object-side surface of the sixth lens element is convex.

11. The photographing optical lens assembly according to claim 1, wherein the photographing optical lens assembly satisfies the following condition:

$|f/f_4|+|f/f_5|+|f/f_6|<1.5$ wherein f is a focal length of the photographing optical lens assembly, $f_4$ is a focal length of the fourth lens element, $f_5$ is a focal length of the fifth lens element, and $f_6$ is a focal length of the sixth lens element.

12. The photographing optical lens assembly according to claim 11, wherein the photographing optical lens assembly satisfies the following condition:

$0.05<(CT_2+CT_3)/f<0.19$ wherein $CT_2$ is a central thickness of the second lens element, $CT_3$ is a central thickness of the third lens element, and f is a focal length of the photographing optical lens assembly.

13. The photographing optical lens assembly according to claim 11, wherein the photographing optical lens assembly satisfies the following condition:

$-0.3<(R_7-R_8)/(R_7+R_8)<0.5$ wherein $R_7$ is a curvature radius of the object-side surface of the fourth lens element, and $R_8$ is a curvature radius of the image-side surface of the fourth lens element.

14. The photographing optical lens assembly according to claim 11, wherein the photographing optical lens assembly satisfies the following condition:

$23<V_1-V_2<40$ wherein $V_1$ is an Abbe number of the first lens element, and $V_2$ is an Abbe number of the second lens element.

15. A photographing optical lens assembly comprising, in order from an object side to an image side:
a first lens element with positive refractive power having a convex object-side surface;
a second lens element;
a third lens element;
a fourth lens element having a concave object-side surface and a convex image-side surface, and at least one of the object-side surface and the image-side surface of the fourth lens element being aspheric;
a fifth lens element made of plastic having a convex object-side surface and a concave image-side surface, at least one of the object-side surface and the image-side surface of the fifth lens element being aspheric; and
a sixth lens element made of plastic having a convex object-side surface and a concave image-side surface, at least one of the object-side surface and the image-side surface of the sixth lens element being aspheric.

16. The photographing optical lens assembly according to claim 15, wherein the fifth lens element and the sixth lens element each has at least one inflection point.

17. The photographing optical lens assembly according to claim 15, further comprising a stop, and the photographing optical lens assembly satisfying the following condition:

$0.75<SD/TD<1.10$ wherein SD is an axial distance between the stop and the image-side surface of the sixth lens element, and TD is an axial distance between the object-side surface of the first lens element and the image-side surface of the sixth lens element.

18. The photographing optical lens assembly according to claim 16, wherein the refractive power of the second lens element is negative.

19. The photographing optical lens assembly according to claim 18, wherein the photographing optical lens assembly satisfies the following condition:

$0.05<(CT_2+CT_3)/f<0.19$ wherein $CT_2$ is a central thickness of the second lens element, $CT_3$ is a central thickness of the third lens element, and f is a focal length of the photographing optical lens assembly.

20. The photographing optical lens assembly according to claim 18, wherein the photographing optical lens assembly satisfies the following conditions:

$-0.3<(R_7-R_8)/(R_7+R_8)<0.5$; and $-0.3<(R_9-R_{10})/(R_9+R_{10})<0.6$ wherein $R_7$ is a curvature radius of the object-side surface of the fourth lens element, $R_8$ is a curvature radius of the image-side of the fourth lens element, $R_9$ is a curvature radius of the object-side surface of the fifth lens element, and $R_{10}$ is a curvature radius of the image-side surface of the fifth lens element.

21. The photographing optical lens assembly according to claim 17, further comprising an image sensor and an image plane, and the photographing optical lens assembly satisfying the following conditions:

$23<V_1-V_2<40$; and $TTL/ImgH<2.5$ wherein ImgH is one half of the diagonal length of the effective photosensitive area of the image sensor, TTL is an axial distance between the object-side surface of the first lens element and the image plane, $V_1$ is an Abbe number of the first lens element, and $V_2$ is an Abbe number of the second lens element.

22. The photographing optical lens assembly according to claim 17, wherein the photographing optical lens assembly satisfies the following conditions:

$|f/f_4|+|f/f_5|+|f/f_6|<1.5$ wherein f is a focal length of the photographing optical lens assembly, $f_4$ is a focal length of the fourth lens element, $f_5$ is a focal length of the fifth lens element, and $f_6$ is a focal length of the sixth lens element.

* * * * *